US012270532B2

(12) United States Patent
Brown

(10) Patent No.: US 12,270,532 B2
(45) Date of Patent: Apr. 8, 2025

(54) ILLUMINATED TENT APPARATUS AND ILLUMINATED GARMENT APPARATUS

(71) Applicant: FUSE, LLC, Memphis, TN (US)

(72) Inventor: Matthew S. Brown, Falkner, MS (US)

(73) Assignee: FUSE, LLC, Memphis, TN (US)

( * ) Notice: Subject to any disclaimer, the term of this patent is extended or adjusted under 35 U.S.C. 154(b) by 0 days.

(21) Appl. No.: 17/828,518

(22) Filed: May 31, 2022

(65) Prior Publication Data

US 2022/0364712 A1    Nov. 17, 2022

Related U.S. Application Data

(63) Continuation of application No. 16/860,339, filed on Apr. 28, 2020, now Pat. No. 11,346,531, which is a
(Continued)

(51) Int. Cl.
*F21V 21/08* (2006.01)
*A41D 13/01* (2006.01)
(Continued)

(52) U.S. Cl.
CPC .......... *F21V 21/0832* (2013.01); *A41D 13/01* (2013.01); *E04H 15/10* (2013.01);
(Continued)

(58) Field of Classification Search
CPC .......... E04H 15/10; F21S 4/26; F21V 19/004; F21V 19/0045; F21V 21/34;
(Continued)

(56) References Cited

U.S. PATENT DOCUMENTS

| 3,500,014 A | 3/1970 | Longo |
| 4,871,597 A | 10/1989 | Hobson |

(Continued)

FOREIGN PATENT DOCUMENTS

| DE | 19503678 A1 * | 8/1996 | ............. G08B 5/004 |
| EP | 0985785 A2 * | 3/2000 | ............. E04H 15/10 |

(Continued)

OTHER PUBLICATIONS

Hong H P, "Clothes having emitting function", Oct. 11, 2017, Espacenet Patent Translate powered by EPO and Google, Patent KR 20170110265 A, pp. 1-27. (Year: 2017).*
(Continued)

*Primary Examiner* — Alan B Cariaso
(74) *Attorney, Agent, or Firm* — ASHLEY LAW FIRM P.C.; Stephen S. Ashley, Jr.

(57) ABSTRACT

An illumination apparatus can include a light assembly having a housing section and an attachment section. At least one light emitting device is contained within the housing section. The attachment assembly can include a substantially flat base section and an attachment member extending outwardly from the base section. The attachment section of the light assembly can define a recess having a size and shape that is complementary to the attachment member of the attachment assembly, such that the light assembly and the attachment assembly can be releasably attached to each other by complementary frictional engagement of the attachment member of the attachment assembly and the attachment section of the light assembly when the attachment member is positioned within the attachment section.

20 Claims, 27 Drawing Sheets

Related U.S. Application Data continuation-in-part of application No. PCT/US2018/057981, filed on Oct. 29, 2018.

(60) Provisional application No. 62/895,718, filed on Sep. 4, 2019, provisional application No. 62/852,572, filed on May 24, 2019, provisional application No. 62/578,455, filed on Oct. 29, 2017.

(51) Int. Cl.

| | | |
|---|---|---|
| *E04H 15/10* | (2006.01) | |
| *F21S 4/26* | (2016.01) | |
| *F21V 8/00* | (2006.01) | |
| *F21V 19/00* | (2006.01) | |
| *F21V 21/088* | (2006.01) | |
| *F21V 21/096* | (2006.01) | |
| *F21V 21/34* | (2006.01) | |
| *F21V 33/00* | (2006.01) | |
| *F21Y 115/10* | (2016.01) | |

(52) U.S. Cl.
CPC ............ *F21S 4/26* (2016.01); *F21V 19/004* (2013.01); *F21V 19/0045* (2013.01); *F21V 21/088* (2013.01); *F21V 21/096* (2013.01); *F21V 21/34* (2013.01); *F21V 33/0008* (2013.01); *G02B 6/001* (2013.01); *F21Y 2115/10* (2016.08)

(58) Field of Classification Search
CPC .. F21V 33/006; F21V 33/008; F21V 33/0008; F21V 21/088; F21V 21/096; G02B 6/001; A41D 13/01; F21Y 2115/10
USPC ........................................................ 362/581
See application file for complete search history.

(56) References Cited

U.S. PATENT DOCUMENTS

| | | | |
|---|---|---|---|
| 4,886,183 A | 12/1989 | Fleming | |
| 4,970,631 A | 11/1990 | Marshall | |
| 5,067,771 A | 11/1991 | Ellis | |
| 5,119,279 A | 6/1992 | Makowsky | |
| 5,207,076 A | 5/1993 | Sciarrillo | |
| 5,415,305 A | 5/1995 | Drake-Tipton et al. | |
| 5,613,756 A | 5/1997 | Allen | |
| 5,969,592 A | 10/1999 | Reed | |
| 6,092,905 A | 7/2000 | Kochn | |
| 6,158,870 A | 12/2000 | Ramirez | |
| 6,286,709 B1 | 9/2001 | Hudson | |
| 6,382,825 B1* | 5/2002 | Wainwright | ............ E04H 15/10 362/576 |
| 6,786,614 B2 | 9/2004 | Ciarrocchi, Jr. | |
| D516,875 S | 3/2006 | Hicks et al. | |
| 7,021,594 B2 | 4/2006 | Exler | |
| D533,751 S | 12/2006 | Exler | |
| 7,234,853 B2* | 6/2007 | Givoletti | ................ G02B 6/001 385/115 |
| D547,618 S | 7/2007 | Exler | |
| 7,922,031 B1 | 4/2011 | Prince | |
| 8,334,780 B1 | 12/2012 | Mendoza, Jr. | |
| 8,752,726 B2 | 6/2014 | Molz | |
| 8,870,018 B2 | 10/2014 | Cook et al. | |
| 9,568,186 B2 | 2/2017 | Brown | |
| 9,671,158 B1 | 6/2017 | Sandberg et al. | |
| 9,689,562 B2* | 6/2017 | Volpato | .................... F21S 2/00 |
| 10,234,086 B2 | 3/2019 | Nathaniel | |
| 10,827,863 B2 | 11/2020 | Brown et al. | |
| 10,893,062 B2 | 1/2021 | Nakanelua et al. | |
| 10,996,488 B2 | 5/2021 | Brown | |
| 2002/0188657 A1 | 12/2002 | Traversat et al. | |
| 2006/0196218 A1 | 9/2006 | Mogil | |
| 2008/0072945 A1* | 3/2008 | Grand Pre | ............. E04H 15/10 135/96 |
| 2008/0184619 A1* | 8/2008 | Heighton | ................. A01G 9/28 47/33 |
| 2008/0198579 A1 | 8/2008 | Crye et al. | |
| 2008/0285621 A1 | 11/2008 | Rowen | |
| 2011/0102304 A1 | 5/2011 | Nelson | |
| 2011/0176326 A1* | 7/2011 | Stephan | ............... G02B 6/0008 362/555 |
| 2011/0222272 A1 | 9/2011 | Yeh | |
| 2012/0002400 A1 | 1/2012 | Lindholm | |
| 2013/0077289 A1* | 3/2013 | Gridley | ............... F21V 33/0008 362/103 |
| 2013/0168399 A1 | 7/2013 | Harrison-Griffin | |
| 2014/0268777 A1* | 9/2014 | Saydkhuzhin | ...... F21V 21/0832 362/249.04 |
| 2015/0077975 A1 | 3/2015 | Brown | |
| 2015/0182046 A1 | 7/2015 | Walsh | |
| 2015/0259945 A1 | 9/2015 | Klinkel et al. | |
| 2015/0366383 A1 | 12/2015 | Raunio et al. | |
| 2016/0010845 A1 | 1/2016 | Brown | |
| 2016/0123572 A1 | 5/2016 | Mohadjeri | |
| 2016/0348890 A1* | 12/2016 | Polanowski | ........ F21V 33/0008 |
| 2020/0284424 A1 | 9/2020 | Brown | |
| 2021/0052097 A1 | 2/2021 | Brown et al. | |

FOREIGN PATENT DOCUMENTS

| | | | | |
|---|---|---|---|---|
| EP | 3073192 A1 * | 9/2016 | ............. | A41D 13/01 |
| GB | 2496539 A * | 5/2013 | ............. | A41D 13/01 |
| GB | 2530484 A | 3/2016 | | |
| KR | 20170110265 A * | 10/2017 | ............. | A41D 1/002 |
| WO | WO-2010004073 A1 * | 1/2010 | ............. | E04H 15/10 |

OTHER PUBLICATIONS

Klingberg G, "Tent with Additional Comfort Equipment", Mar. 15, 2000, EPO machine-generated English translation, Description & Claims of EP0985785A2 Publication, 8 pages. (Year: 2000).*

Klingberg G, "Tent with Additional Comfort Equipment", Mar. 15, 2000, EP 0985785 A2 Publication image document merged with English translation text, 8 pages. (Year: 2000).*

Gellhaus O, "Beleuchtungsanordnung"/"Lighting Arrangement", Aug. 1, 1996, Espacenet Patent Translate powered by EPO and Google, Patent DE 19503678 A1, 14 pages. (Year: 1996).*

* cited by examiner

ILLUMINATED TENT APPARATUS AND ILLUMINATED GARMENT APPARATUS

CROSS REFERENCE TO RELATED APPLICATIONS

This application is a continuation of U.S. patent application Ser. No. 16/860,339, filed Apr. 28, 2020, now U.S. Pat. No. 11,346,531, which is a continuation-in-part of International Application No. PCT/US2018/057981, filed Oct. 29, 2018, which claims priority to U.S. Provisional Patent Application No. 62/578,455, filed Oct. 29, 2017. In addition, this application is a continuation of U.S. patent application Ser. No. 16/860,339, filed Apr. 28, 2020, which claims priority to U.S. Provisional Patent Application No. 62/852,572, filed May 24, 2019, and U.S. Provisional Patent Application No. 62/895,718, filed Sep. 4, 2019. All of said applications are incorporated herein by reference.

TECHNICAL FIELD

The present invention relates to illumination devices. One embodiment of the invention comprises an illumination device adapted for being attached to a structure, such as a tent or canopy.

BACKGROUND

Tents, canopies, and similar temporary shelters are commonly used in outdoor recreational activities, such as camping, picnics and sporting events. Such activities are often done outdoors at night, in locations that do not have permanent lighting available. As such, there is a need for an illumination device that can be easily mounted to a tent, canopy or similar structure.

SUMMARY

One object of the present invention is to provide an illumination device that can be mounted on a support structure. Another object of the invention is to provide a convenient means for illuminating the area under a tent or canopy. Another object of the present invention is to provide an illumination device that can be mounted to existing tents, canopies, and similar shelter structures. These and other objects of the invention can be achieved in one or more embodiments of the invention described herein.

One embodiment of the invention comprises a portable illumination apparatus adapted for releasable attachment to a support structure.

Another embodiment of the invention comprises an illumination apparatus adapted to be mounted to a tent, canopy or like structure, and illuminate the area within and around the tent or canopy.

Another embodiment of the invention comprises a kit comprising an illumination device and a mounting device. The mounting device is adapted to be attached to a tent, canopy or like structure, and is adapted for releasable attachment to the illumination device. According to an embodiment of the invention, the illumination device can comprise an elongate structure having an elongate channel formed therein. The mounting device can include a complementary member adapted to be received and retained within the channel of the illumination device.

Another embodiment of the invention comprises an illumination apparatus comprising a light assembly comprising a housing section and an attachment section. At least one light emitting device is contained within the housing section. An attachment assembly is adapted for releasable attachment with the attachment section of the light assembly.

According to another embodiment of the invention, the attachment assembly comprises a substantially flat base section and an attachment member extending outwardly from the base section.

According to another embodiment of the invention, the attachment section of the light assembly defines a recess having a size and shape that is complementary to the attachment member of the attachment assembly, such that the light assembly and the attachment assembly can be releasably attached to each other by complementary frictional engagement of the attachment member of the attachment assembly and the attachment section of the light assembly when the attachment member is positioned within the attachment section.

According to another embodiment of the invention, the light assembly can slide on the attachment assembly when the attachment member is positioned in the attachment section.

According to another embodiment of the invention, the attachment assembly is attached to a substantially rectangular fabric sheet comprising an outer surface and an inner surface, and first and second opposed sides.

According to another embodiment of the invention, the attachment assembly is attached to the outer surface of the fabric sheet, and first and second complementary fasteners are adapted for releasable engagement with each other. The first fastener is positioned on the outer surface of the fabric sheet proximate the first side, and the second fastener is positioned on the inner surface of the fabric sheet proximate the second side.

According to another embodiment of the invention, the first and second complementary fasteners can be hook and loop fasteners, magnets and/or buttons.

According to another embodiment of the invention, the first fastener can be a plurality of loop fasteners, and the second fastener can be a plurality of hook fasteners.

Another embodiment of the invention comprises an illumination apparatus comprising a flexible sheet comprising an outer surface and an inner surface and first and second opposed sides. A light assembly comprising at least one light emitting device is releasably attached to the outer surface. First and second complementary fasteners are adapted for releasable engagement with each other. The first fastener is positioned on the sheet proximate the first side, and the second fastener is positioned on the sheet proximate the second side.

According to another embodiment of the invention, the flexible sheet comprises a fabric.

According to another embodiment of the invention, the first fastener is positioned on the outer surface, and the second fastener is positioned on the inner surface.

According to another embodiment of the invention, the flexible sheet is rectangular.

According to another embodiment of the invention, the first and second complementary fasteners can be hook and loop fasteners, magnets and/or buttons.

According to another embodiment of the invention, the first fastener comprises a plurality of loop fasteners, and the second fastener comprises a plurality of hook fasteners.

According to another embodiment of the invention, the first fastener comprises a plurality of hook fasteners, and the second fastener comprises a plurality of loop fasteners.

According to another embodiment of the invention, at least one pouch is positioned on the outer surface of the flexible sheet, and the light assembly is positioned within the pouch.

According to another embodiment of the invention, an attachment assembly is attached to the outer surface of the flexible sheet and is adapted for releasable attachment with the light assembly. The attachment assembly comprises a substantially flat base section and an attachment member extending outwardly from the base section. The light assembly comprises a housing section containing at least one light emitting device therein and an attachment section defining a recess having a size and shape that is complementary to the attachment member of the attachment assembly. The light assembly and the attachment assembly are releasably attached to each other by complementary frictional engagement of the attachment member of the attachment assembly and the attachment section of the light assembly when the attachment member is positioned within the attachment section.

Another embodiment of the invention comprises a tent apparatus comprising a tent, canopy or similar structure. The apparatus comprises a support frame, a flexible sheet carried on the support frame, an attachment assembly attached to the flexible sheet, and a light assembly. The light assembly comprises a housing section containing at least one light emitting device therein and an attachment section adapted for releasable attachment to the attachment assembly.

According to another embodiment of the invention, the attachment assembly comprises a substantially flat base section and an attachment member extending outwardly from the base section. The attachment section of the light assembly defines a recess having a size and shape that is complementary to the attachment member of the attachment assembly, whereby the light assembly and the attachment assembly are releasably attached to each other by complementary frictional engagement of the attachment member of the attachment assembly and the attachment section of the light assembly when the attachment member is positioned within the attachment section.

According to another embodiment of the invention, the base section of the attachment assembly is sewn to the flexible sheet of the tent.

DETAILED DESCRIPTION OF PREFERRED EMBODIMENTS

Figure 1:
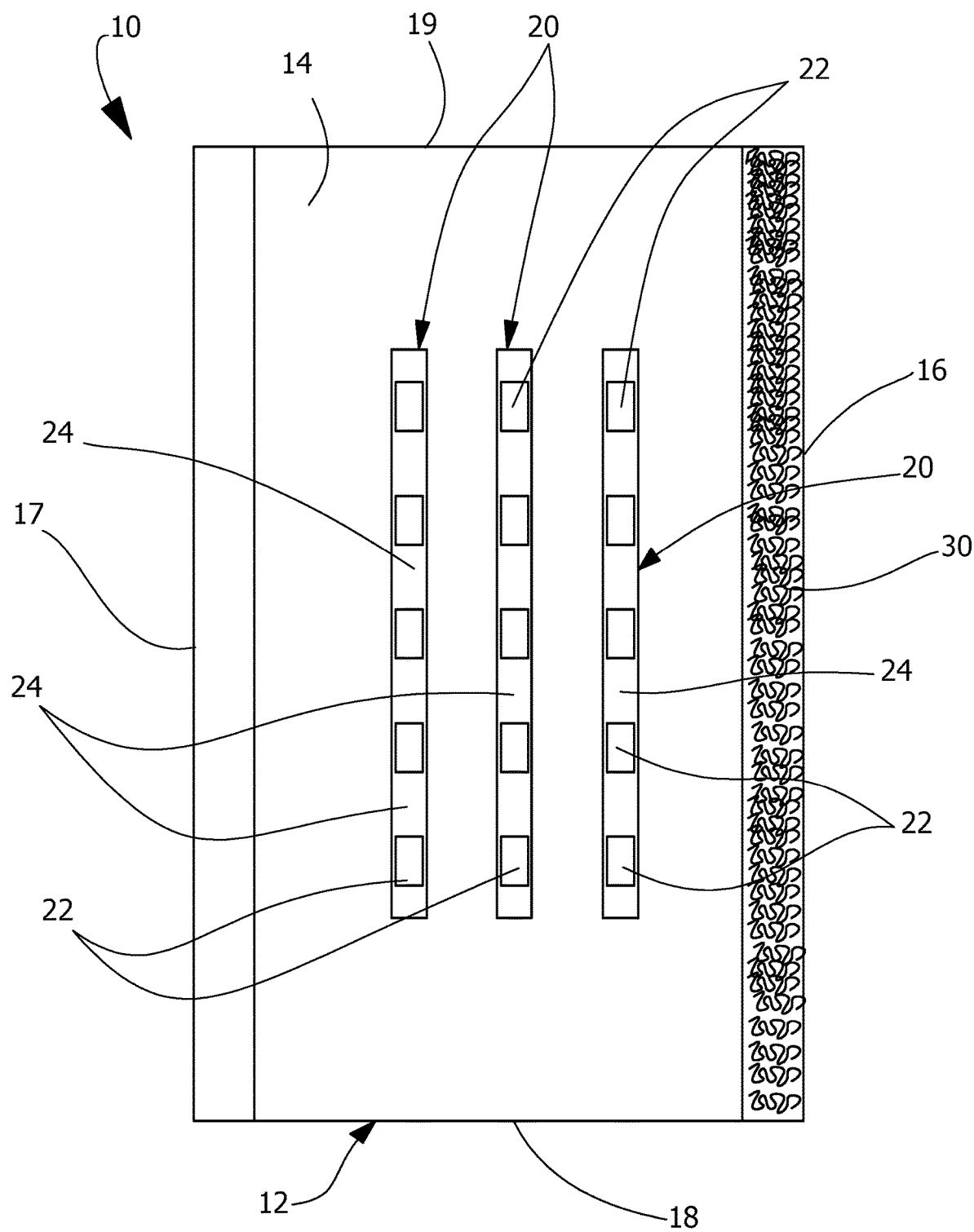
FIG. 1 is perspective view of an illumination apparatus according to a preferred embodiment of the invention.
Figure 2:
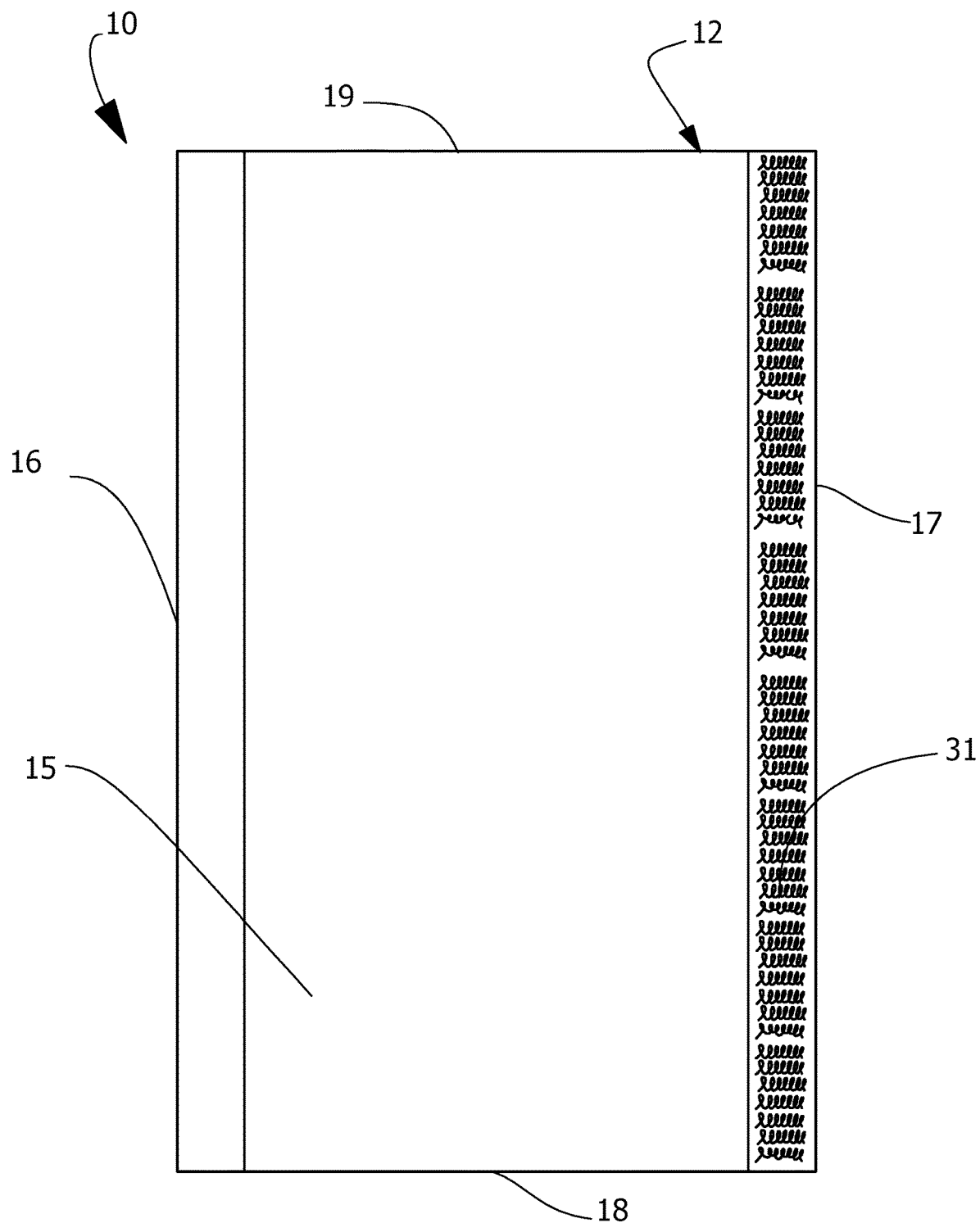
FIG. 2 is another perspective view of the illumination apparatus of FIG. 1.

An illumination apparatus according to a preferred embodiment of the invention is illustrated in FIGS. 1 and 2, and shown generally at reference numeral 10. The illumination apparatus 10 comprises a sheet 12 of flexible material, such as a fabric, and a plurality of light assemblies 20 attached to the fabric sheet 12. The fabric sheet 12 can be comprised of polyester, canvas, or other suitable flexible material. The light assemblies 20 can be made of polyvinyl chloride (PVC) or other suitable material.

The fabric sheet 12 preferably has a substantially rectangular shape, as shown in FIGS. 1 and 2. The sheet 12 has an outer surface 14, shown in FIG. 1, and an inner surface 15, shown in FIG. 2. The light assemblies 20 are positioned on the outer surface 14, as shown in FIG. 1. The sheet 12 has opposed sides 16, 17 extending longitudinally along the length of the cover 12, and two shorter opposed ends 18, 19 extending substantially perpendicularly to opposed sides 16, 17, as shown in FIG. 1.

Figure 4:
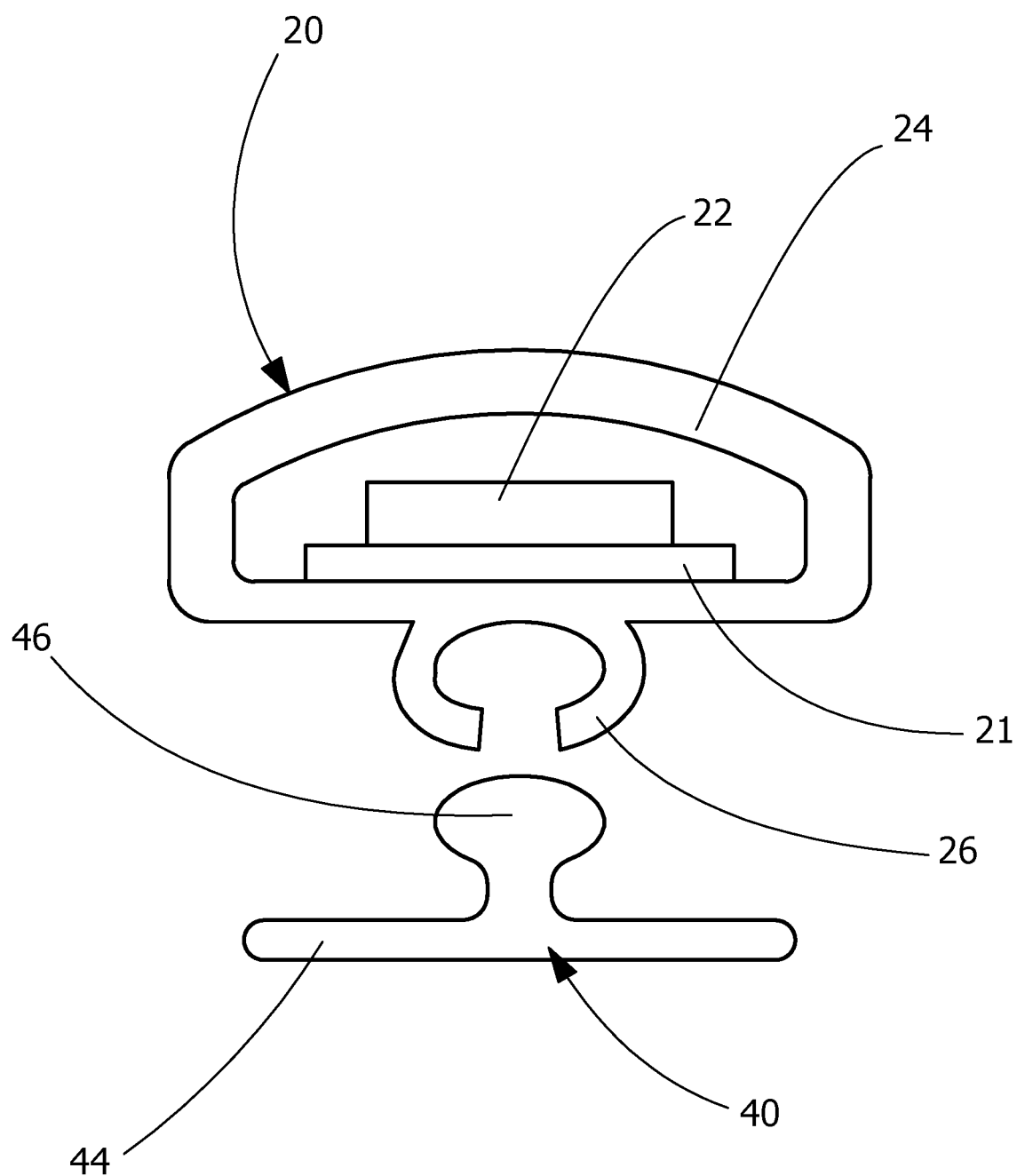
FIG. 4 is a side profile of an illumination apparatus according to an embodiment of the invention.
Figure 5:
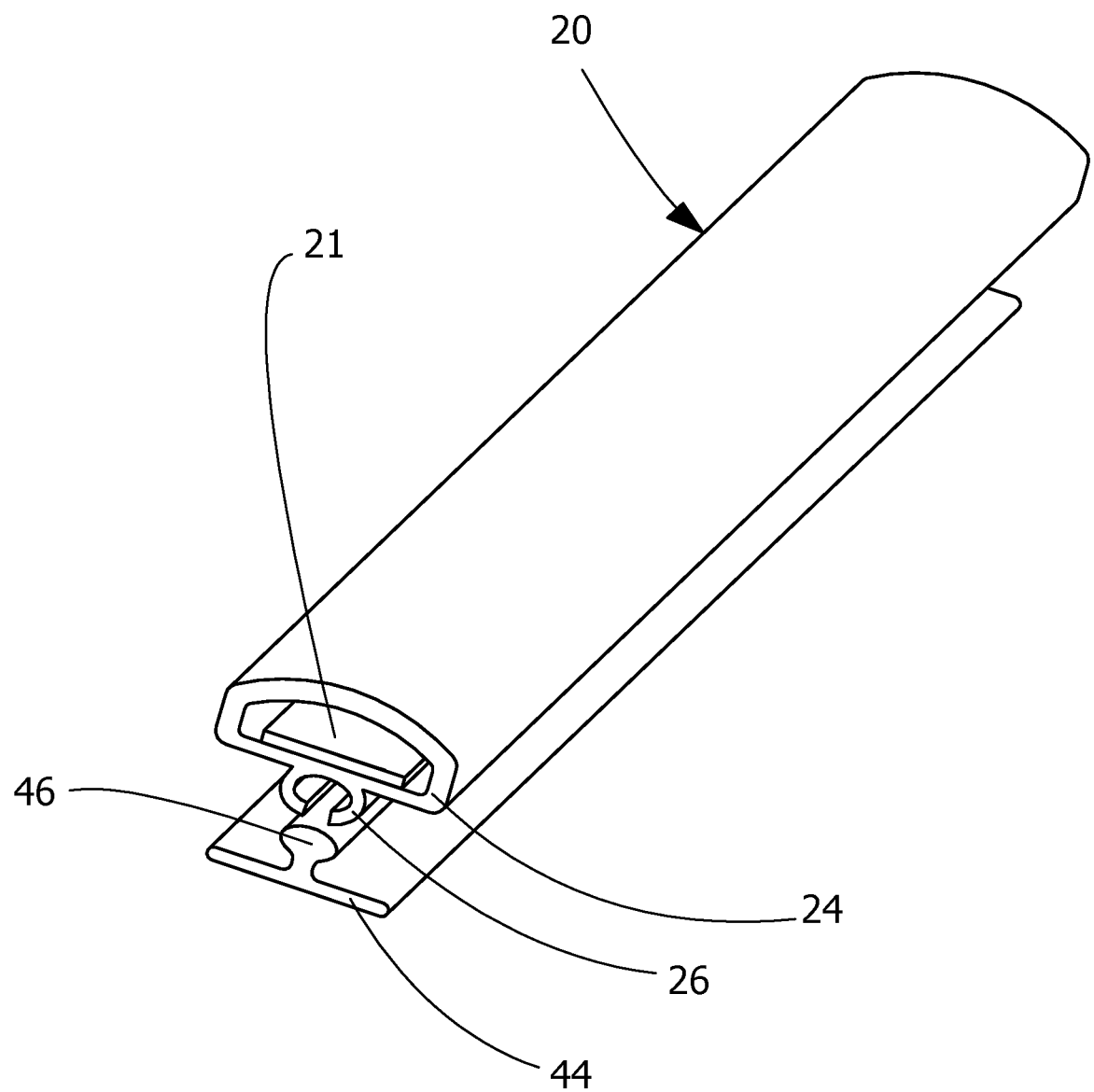
FIG. 5 is a perspective view of the illumination apparatus of FIG. 4.

Each light assembly 20 comprises at least one light emitting device. Preferably, each light assembly 20 is comprised of a housing section 24 and an attachment section 26, as shown in FIGS. 4 and 5. Contained within the housing 24 is a light emitting device, such as an LED strip 21 comprising a flexible printed circuit board and a plurality of light emitting diodes 22, as shown in FIGS. 4-8. Alternatively, the light emitting devices can be incandescent light bulbs or illuminated fiber optic cables. The LED string 21 can be powered by a USB connector 27 that can be operatively connected to the LED strip 21 and a power unit 60, as shown in FIG. 7. Each end of the housing section 24 can be closed with a removable seal cover 28, shown in FIG. 8. Some or all of the housing section 24 is comprised of a transparent or translucent material so that light emitted from the light emitting diodes 22 is visible through the housing section 24.

Figure 3:
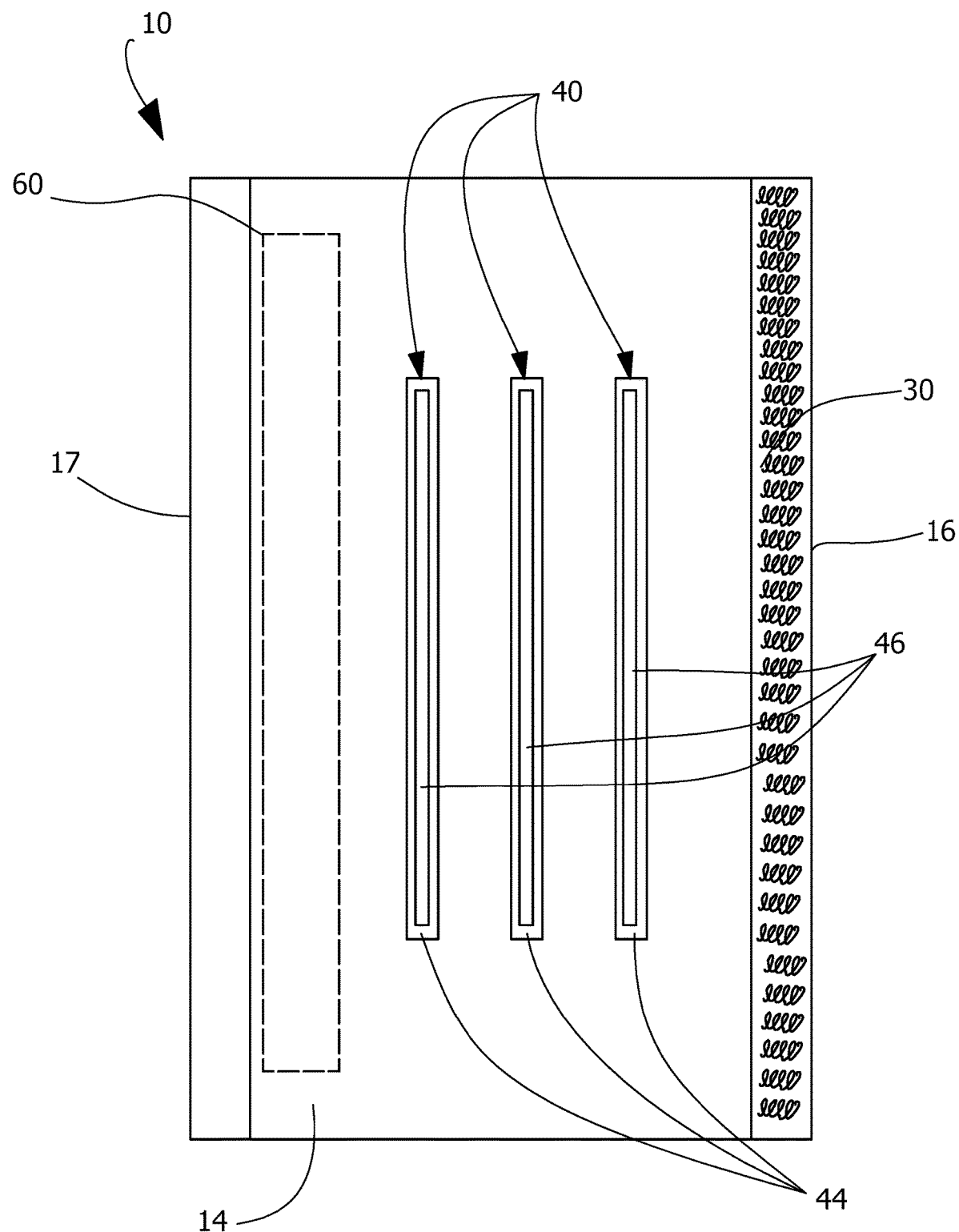
FIG. 3 is another perspective view of the illumination apparatus of FIG. 1.

Each light assembly 20 can be attached to the fabric sheet 12 by way of an attachment assembly 40. Each attachment assembly 40 can be an elongate rail-like assembly comprised of a base section 44 and an attachment member 46 extending upwardly from the base 44, as shown in FIGS. 4 and 5. The attachment assemblies 40 are attached to the outer surface 14 of the fabric sheet, as shown in FIG. 3. Preferably, the base 44 of each attachment assembly 40 is sewn to the fabric sheet 12. Alternatively, the attachment assemblies 40 can be attached to the fabric sheet 12 by other means, such as an adhesive applied to the under surface of the base 44. The attachment assembly 40 can be made of silicone or other suitable material. The light assembly 20 and the attachment assembly 40 are elongate and approximately equal in length. The housing section 24 and attachment section 26 of each light assembly 20 can be made of plastic or other suitable material. According to a preferred embodiment, the housing section 24 and attachment section 26 are comprised of thermoplastic polyurethane (TPU).

The attachment section 26 of each light assembly 20 can define a recessed channel, as shown in FIG. 4. The recessed channel defined by the attachment section 26 of each light assembly 20 and that attachment member 46 of each attachment assembly 40 are sized and shaped for complementary frictional engagement with each other. As shown in FIG. 4, the attachment member 46 can have an oval head and the attachment section 26 of the light assembly 20 can define an similar oval shape of slightly larger size so that the attachment member 46 can be slid into the recessed channel of the attachment section 26 and retained therein, as shown in FIG. 6.

Figure 6:
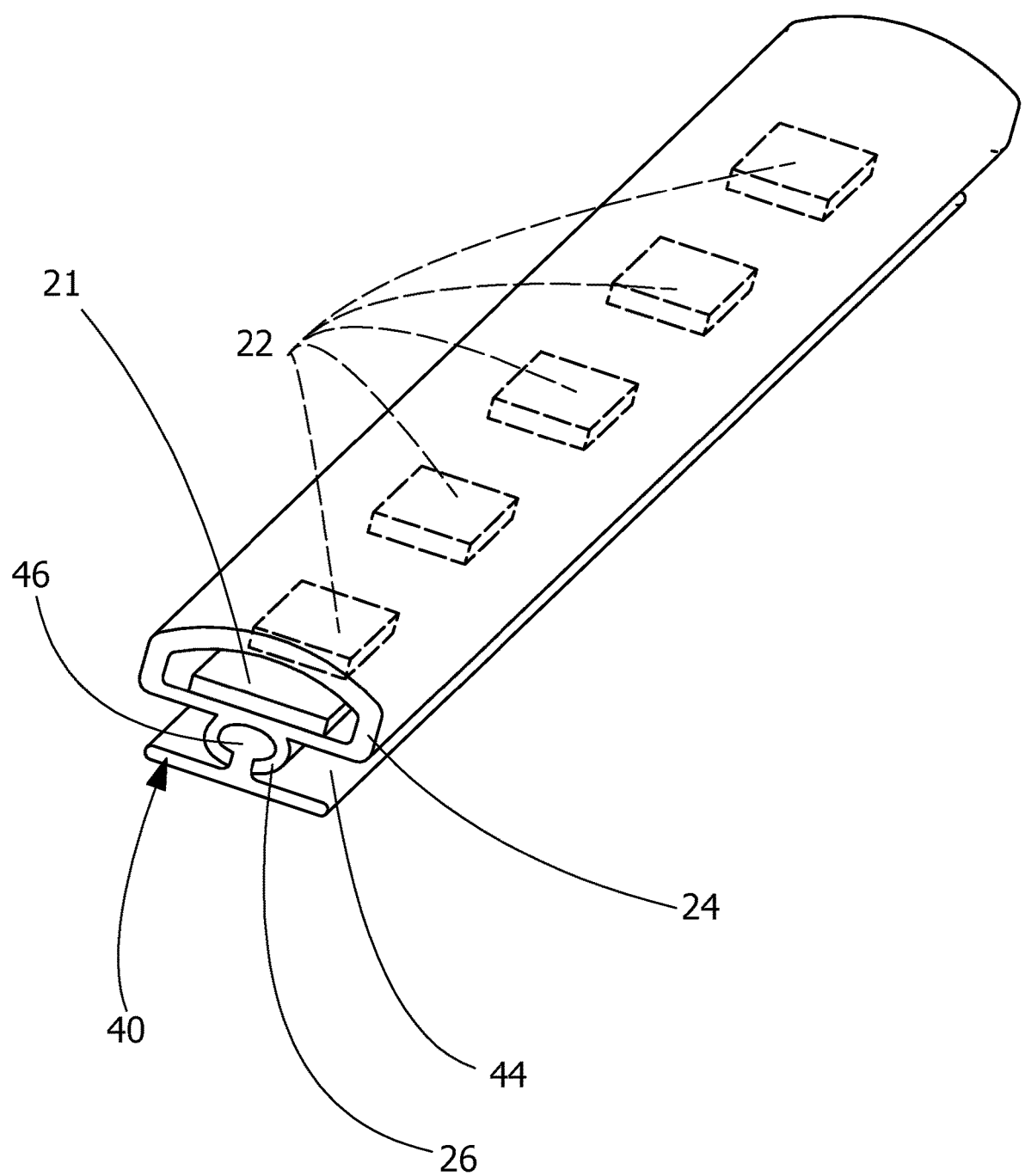
FIG. 6 is another perspective view of the illumination apparatus of FIG. 4.
Figure 7:
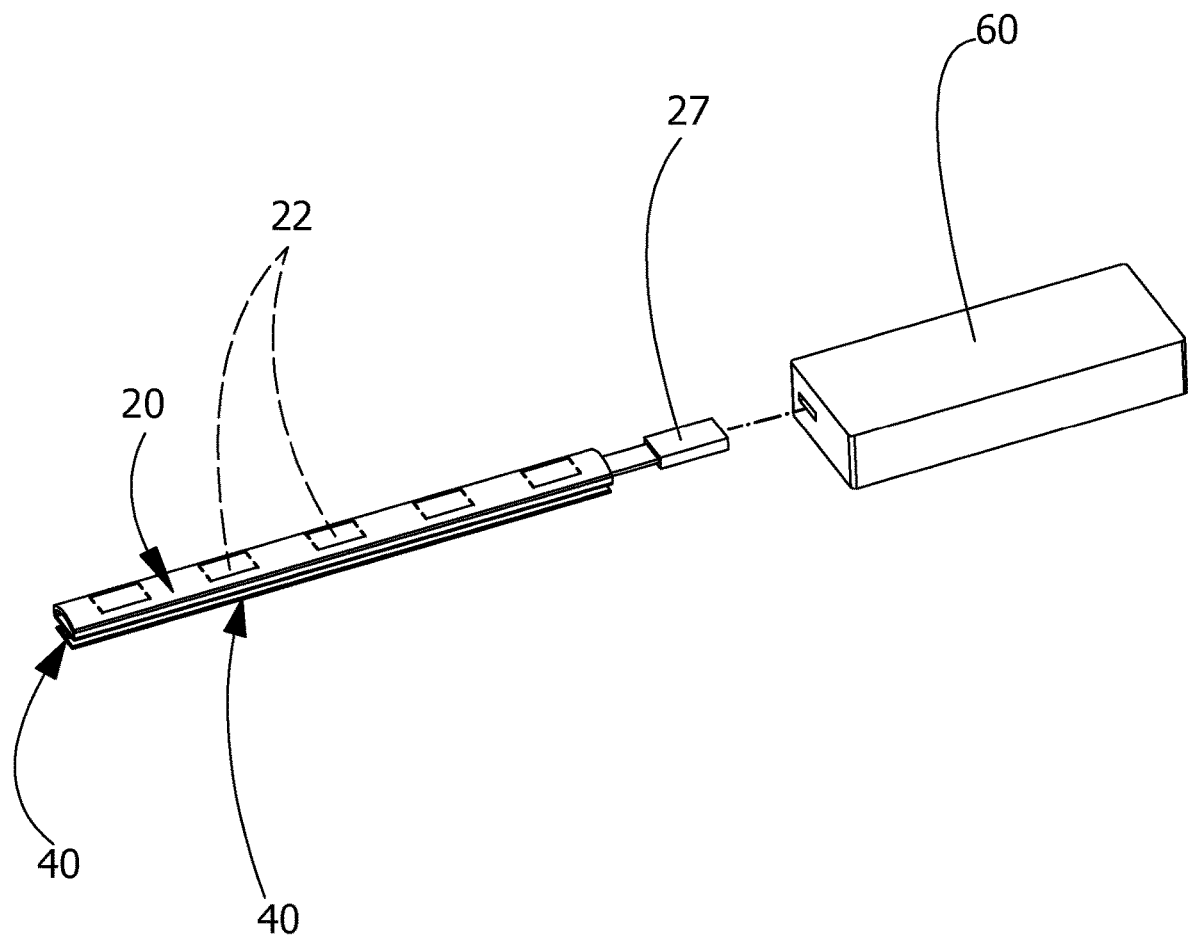
FIG. 7 is another perspective view of the illumination apparatus of FIG. 4.
Figure 8:
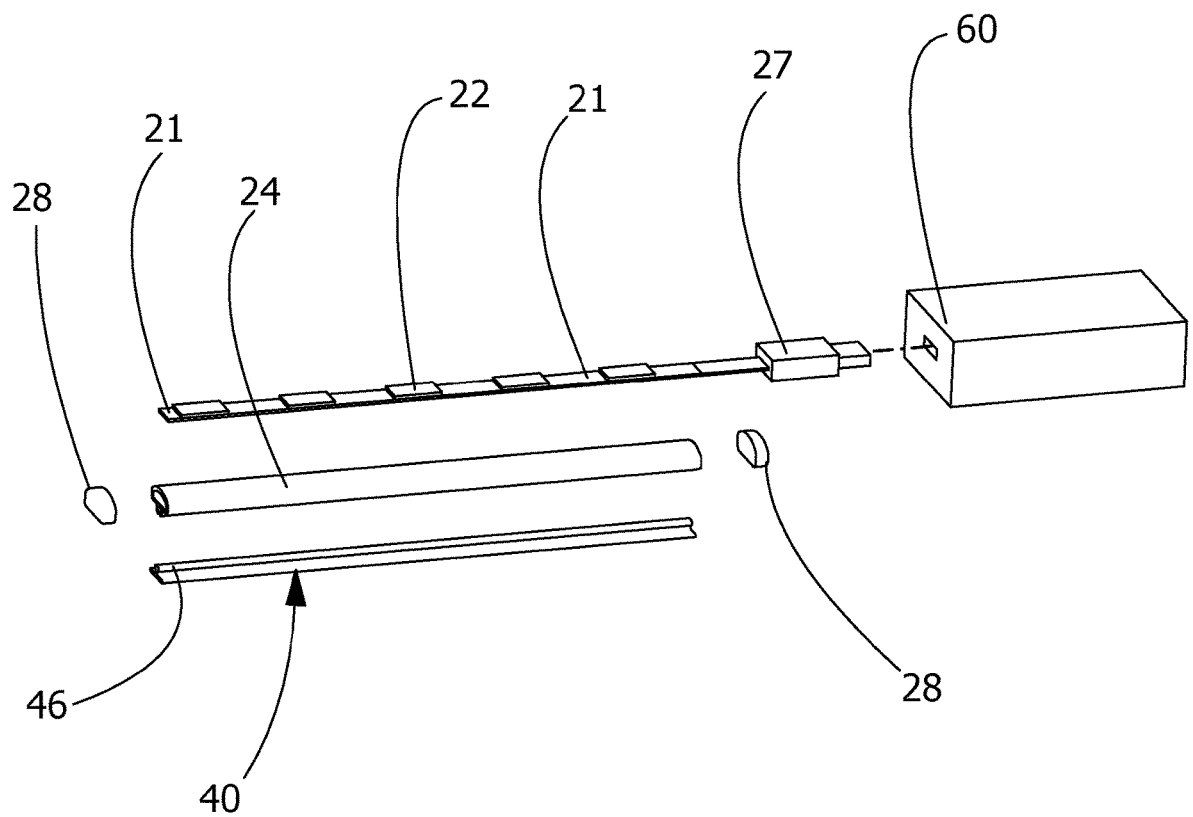
FIG. 8 is an exploded perspective view of the illumination apparatus of FIG. 4.

The light assembly 20 can be releasably attached to the attachment assembly 40 by aligning one end of the attachment section 26 with an end of the attachment member 46 and sliding the light assembly 20 until the attachment member 46 is positioned entirely within the attachment section 26 of the light assembly 20, as shown in FIG. 6. As such, the light assembly 20 and attachment assembly 40 are releasably engaged to each other. The light assembly 20 can be released from the attachment assembly 40 by sliding the light assembly 20 off of the complementary attachment member 46 of the attachment assembly 40. As such, the light assembly 20 can be easily removed for various reasons such as charging with the power unit 60 or replacing burned out light emitting diodes 22.

The sheet 12 comprises means for releasably attaching the opposed sides 16, 17 to each other. Complementary fasteners can be positioned proximate the opposed sides 16, 17 that are adapted for releasable engagement with each other. Preferably, the complementary fasteners comprise hook and loop fasteners. As shown in FIGS. 1 and 2, a section of loop fasteners 30 can be attached on the outer surface 14 of the sheet 12 proximate one side 16, and a section of hook fasteners 31 can be attached on the inner surface 15 proximate the opposed side 17. The hook and loop sections 31, 30 can be sewn to the sheet 12, or attached by other suitable means such as an adhesive. Alternatively, hook fasteners 31 can be attached on the outer surface 14 of the cover 12 proximate side 16, and loop fasteners 30 can be attached on the inner surface 15 proximate the opposed side 17. Alternatively, the complementary fasteners can be magnets, snaps or buttons.

The apparatus 10 includes a power source operatively connected to the light emitting diodes 22 to power the light emitting diodes 22. The power source can be a power unit 60 comprising a battery that can be operatively connected to the light emitting diodes 22. The fabric sheet 12 can include a pouch for containing the power unit 60, as shown in FIG. 3. Alternatively, the power source can be a solar cell that powers the light emitting diodes 22. Preferably, the power source comprises a solar cell that recharges a battery. As such, the battery can be recharged when the apparatus 10 is exposed to sunlight.

Figure 14:
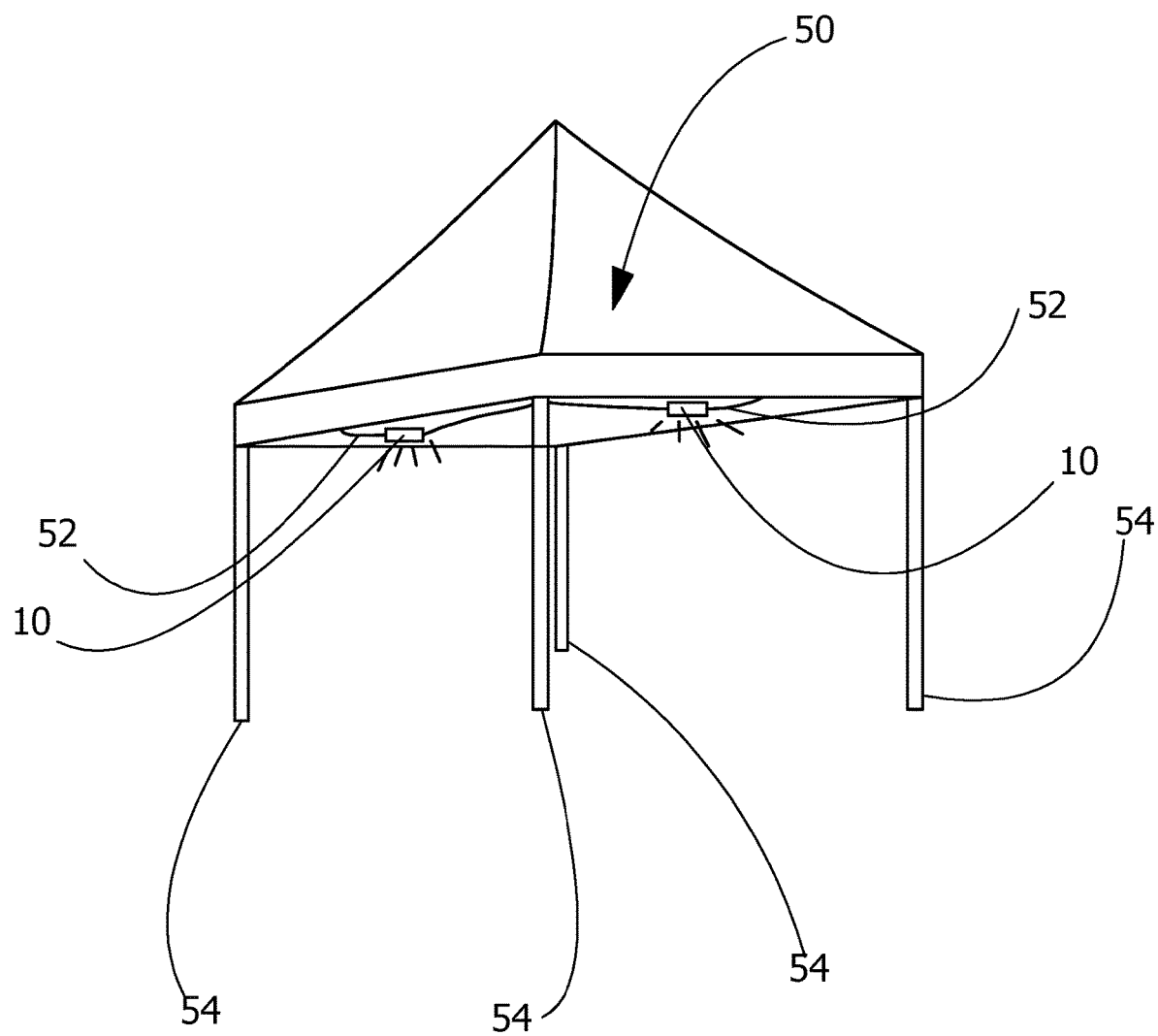
FIG. 14 is another environmental perspective view of the apparatus of FIG. 1.

In a method of using the apparatus 10 according to a preferred embodiment of the invention, the apparatus can be used to illuminate the area within and/or around a tent, canopy or like structure. The sheet 12 can be positioned on a support structure, such as one of the elongate support members that comprise the support frame for a tent, canopy or like structure. For example, the support member can be one of the elongate rods or tubes 52 supporting the top of a tent or canopy 50, as shown in FIG. 14. Alternatively, the support member can be one of the elongate poles or legs 54 that are positioned on the ground and extend upwardly therefrom to support the tent or canopy 50, shown in FIG. 14.

Figure 13:
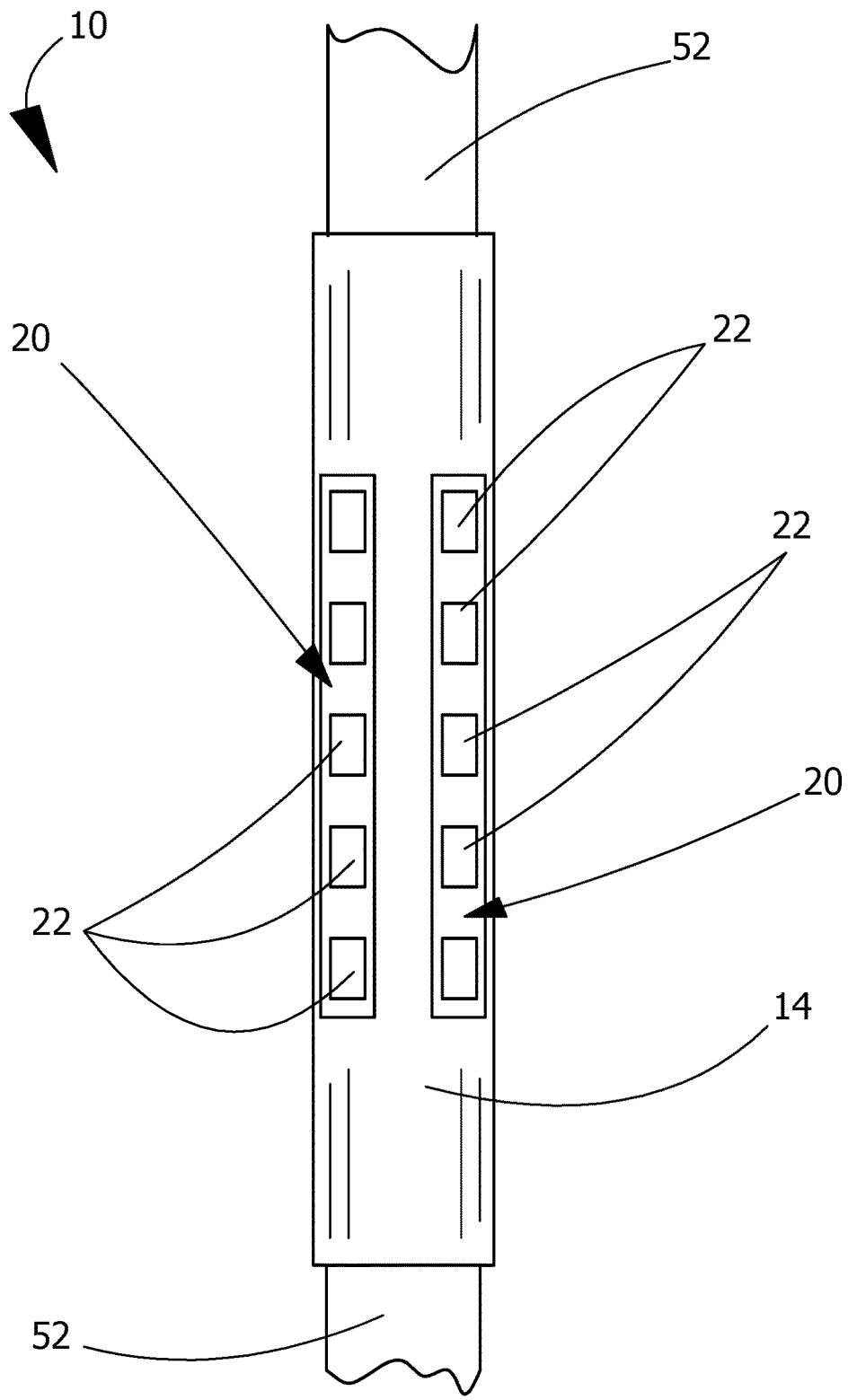
FIG. 13 is an environmental perspective view of the apparatus of FIG. 1.

As shown in FIGS. 13 and 14, the sheet 12 can be wrapped around the support member 52 with the outer surface 14 of the sheet on the outside (facing outwardly from the support member) and the inner surface 15 inside (facing inwardly toward the support member). The hook fasteners 31 proximate to side 17 are mated to the loop fasteners 30 proximate side 16 of the sheet 12 to secure securing the sheet 12 on the support member 52. The light emitting diodes 22 are activated, and illuminate the area within the tent, canopy or like structure. The illumination apparatus 10 can be attached to virtually any existing tent or canopy, and as such can be sold as an "after-market" item.

In an alternative embodiment, the apparatus 10 can include wireless technology, such as the wireless communication technology sold under the mark "BLUETOOTH", which is operatively connected to the light emitting diodes 22 and a remote control, such that the remote control can turn the light emitting diodes 22 on and off. The remote control can be a computing device comprising a computer processor, such as a computer or mobile smartphone. The remote control can be operated by a human user that activates the light emitting diodes 22 of the light assembly 20 at times the user deems appropriate. Alternatively, the remote control comprises a computer processor and a non-transitory computer readable storage medium comprising software having programming instructions that, when executed, cause the computer processor to automatically activate the light emitting diodes 22 at a predetermined time of day. In another embodiment, the software can be integrated into a mobile application that can be downloaded onto mobile smartphones and allows a user to control the light emitting diodes 22 with a mobile smartphone.

Another embodiment of the invention comprises a kit comprising a plurality of apparatuses 10. The multiple apparatuses 10 can be mounted on multiple support members 52 of a single tent, canopy or like structure, as shown in FIG. 14.

In alternative embodiments, light emitting devices are not attached to the fabric sheet 12 via rail attachment assemblies 40. For example, in one alternative embodiment, the fabric sheet comprises a plurality of pouches formed on the outer surface 14 of the sheet. The pouches can be comprised of a transparent or translucent material. A light emitting device, such as a string or strip 21 of light emitting diodes 22 can be positioned in each transparent/translucent pouch.

In another alternative embodiment, light emitting devices can be attached to the fabric sheet 12 by an adhesive. Alternatively, the light emitting diodes can be retained within openings formed in the fabric sheet 12. In another alternative embodiment, the sheet 12 can comprise two layers of material and light emitting devices 12 can be housed in between the two layers of material.

Figure 9:
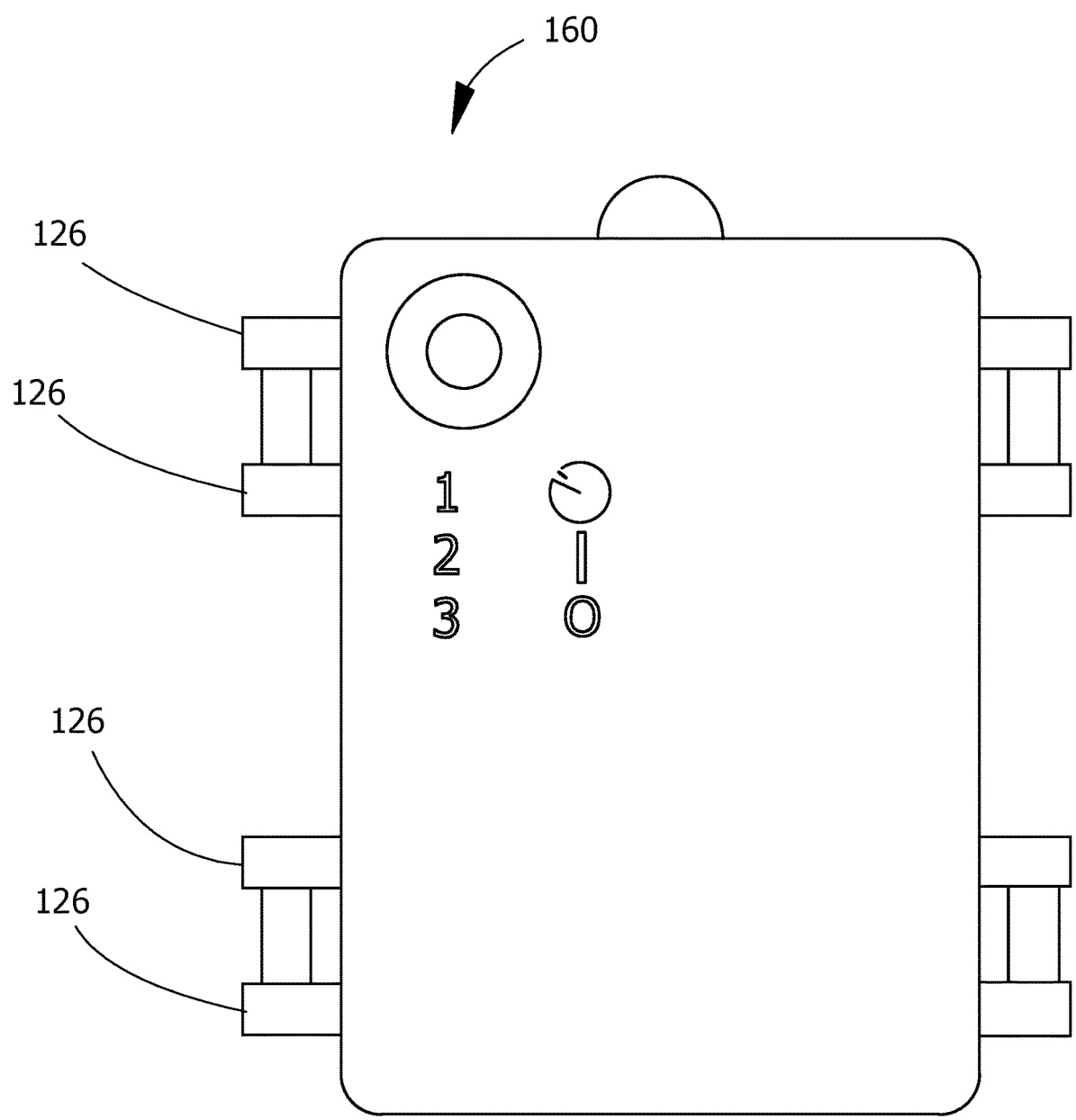
FIG. 9 is a top plan view of a power unit according to an embodiment of the invention.
Figure 10:
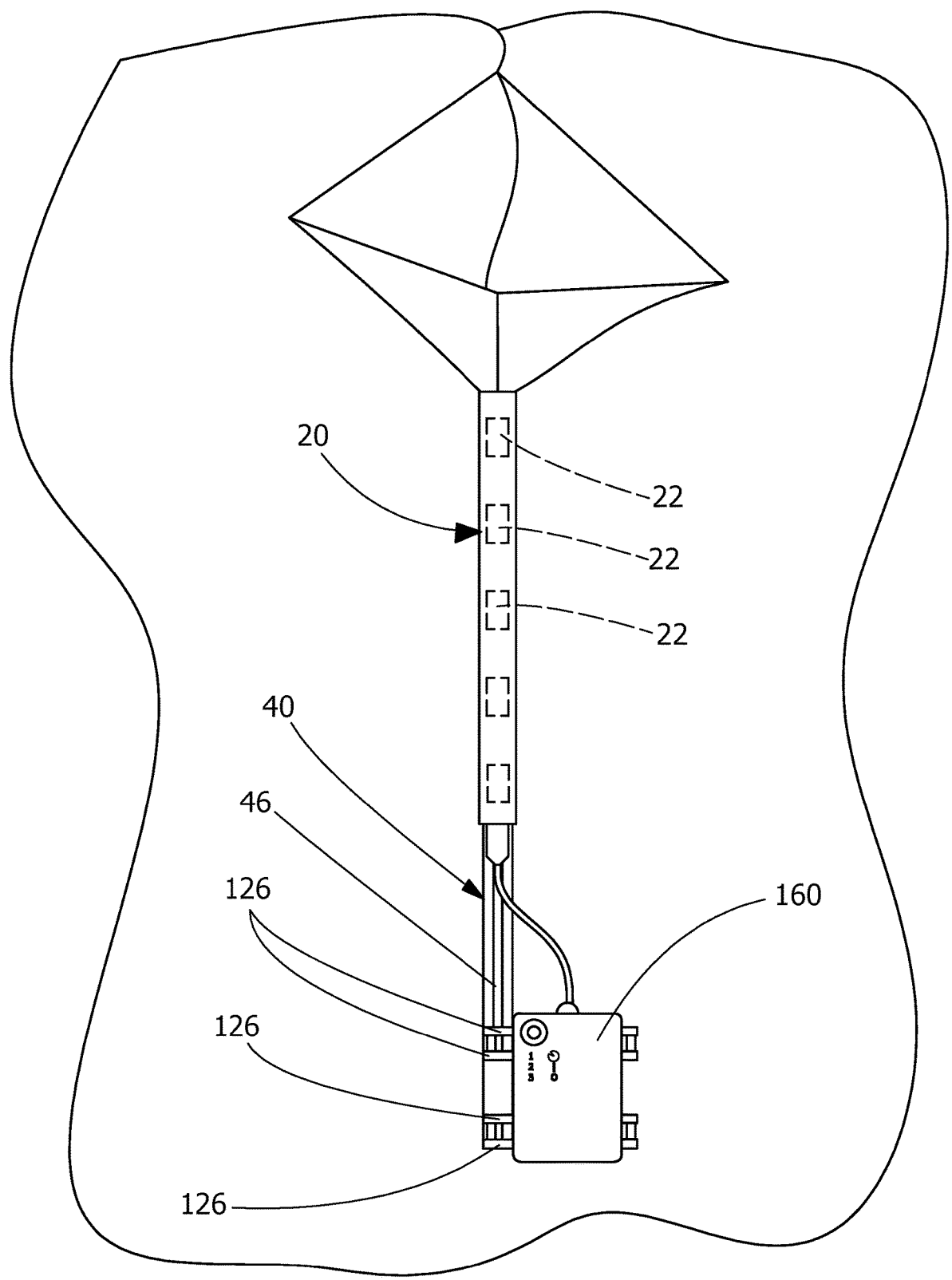
FIG. 10 is a perspective view of another embodiment of the invention.

Another embodiment of the invention comprises a tent apparatus comprising a tent, canopy or similar structure. At least one rail attachment assembly 40 is attached to a part of the tent, canopy or similar structure. As shown in FIG. 10, an attachment assembly 40 can be sewn at a seam of the fabric of the tent 50, and a light assembly 20 is releasably attached to the attachment assembly 40. A power unit 160, shown in FIG. 9, is adapted to power the light emitting diodes 22 and control brightness of the light emitting diodes 22. As shown in FIG. 9, the power unit 160 has a plurality of outwardly extending attachment sections 126 that are adapted for complementary engagement with the rail attachment assembly 40. Like the attachment sections 26 of the light assembly 20, the attachment sections 126 of power unit 160 define a recess channel that is sized and shaped to receive the attachment member 46 of the attachment assembly 40. As such, the power unit 160 can be releasably attached to the attachment assembly 40, as shown in FIG. 10.

While the light assembly 20 and attachment assembly 40 are described above as being utilized on a tent, the invention is not so limited. The light assembly 20 and attachment assembly 40 can be utilized with other products and structures. One embodiment of the invention comprises a gun case, in which the attachment assembly 40 is attached to the gun case, and the light assembly 20 is releasably attached to the attachment assembly 40.

Another embodiment of the invention comprises a backpack. The attachment assembly 40 is attached to the backpack, and the light assembly 20 is releasably attached to the attachment assembly 40. The attachment assembly 40 can be sewn to the backpack or attached by other means, such as an adhesive.

Another embodiment of the invention comprises a soft sided thermally insulated cooler. The attachment assembly 40 is attached to the cooler, and the light assembly 20 is releasably attached to the attachment assembly 40.

Another embodiment of the invention comprises a luggage bag. The attachment assembly 40 is attached to the luggage bag, and the light assembly 20 can be releasably attached to the attachment assembly 40.

Another embodiment of the invention comprises a garment, such as a shirt, vest or jacket. The base section 44 of the attachment assembly 40 can be attached to the outer surface of the garment. The base 44 of the attachment assembly 40 can be sewn to the fabric of the garment. Alternatively, the attachment assembly 40 can be attached to the garment fabric by an adhesive applied to the under surface of the base 44. Alternatively, the attachment assembly 40 can be attached to the garment by magnets, snap-on fasteners or other suitable fastening means. The light assembly 20 can be releasably attached to the attachment assembly 40. Alternatively, light assembly 200 can be releasably attached to the attachment assembly 40 positioned on the garment.

According to another embodiment of the invention, a garment, such as a shirt, vest or jacket, has a pouch positioned on the outer surface of the garment. The pouch is comprised of a transparent or translucent material. A light emitting device, such as a strip of light emitting diodes can be positioned in the transparent/translucent pouch. The transparent/translucent pouch allows light emanating from the LED strip to pass through so that it is visible to someone looking at the garment.

It should be noted that the invention is not limited to apparatuses having a light emitting device. The housing section 24 can contain items other than light emitting devices 21, 22. In one embodiment, instead of a light emitting device the housing section 24 can contain a temperature regulating element, and the attachment assembly 40 can be attached to a seat bottom or other furniture component. The temperature regulating element can be a heating element or cooling element, such as described in U.S. patent application Ser. No. 16/458,821, which is incorporated by reference herein. The housing section 24 containing the temperature regulating element can be releasably attached to the attachment assembly 40 by positioning the attachment member 46 within the attachment section 26.

Figure 11:
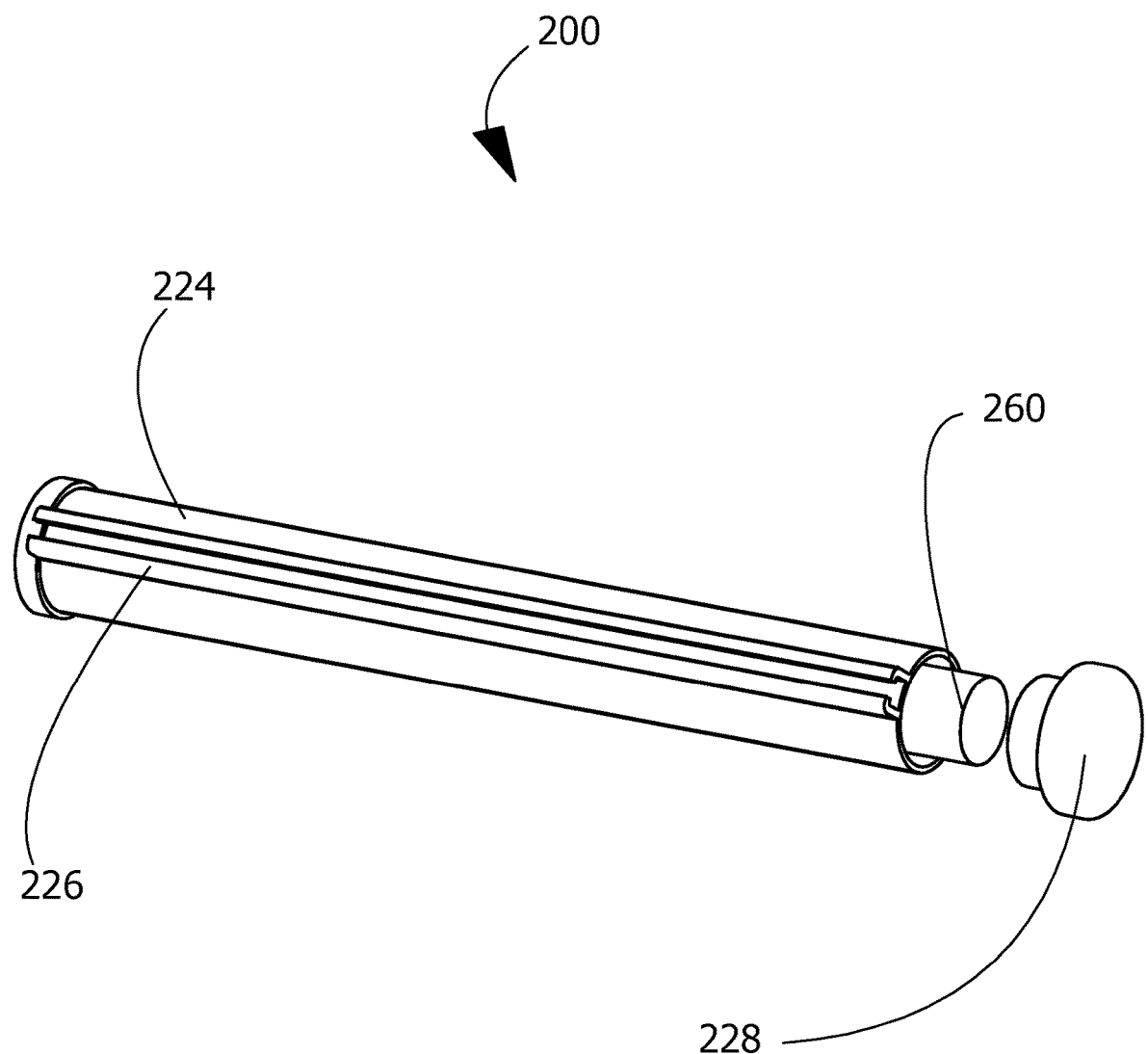
FIG. 11 is a perspective view of an illumination apparatus according to another embodiment of the invention.
Figure 12:
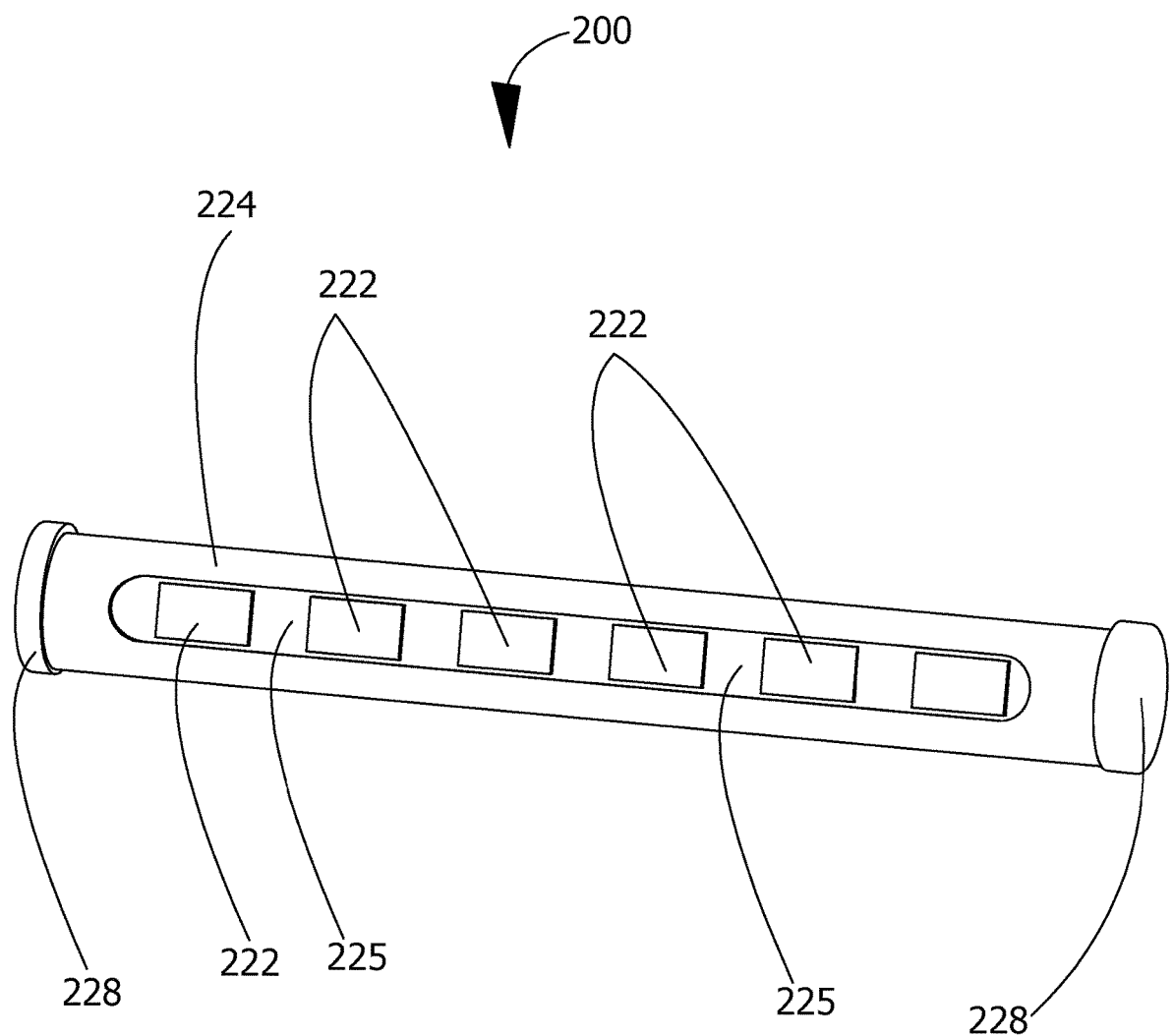
FIG. 12 is another perspective view of the illumination apparatus of FIG. 11.

A light assembly according to another preferred embodiment of the invention is illustrated in FIGS. 11 and 12, and shown generally at reference numeral 200. The light assembly 200 comprises an elongate cylindrical housing section 224 and an attachment section 226 defining a recess channel that is shaped and sized for complementary engagement with the attachment member 46 of the attachment assembly 40. As such, the light assembly 200 can be releasably attached to the attachment assembly 40 by sliding the attachment member 46 of the attachment assembly 40 into the attachment section 226 of the light assembly 200. The attachment section 226 of the light assembly 200 can have the same size and shape as the attachment section 26 of the previously described light assembly 20. The housing 224 can contain a plurality of light emitting diodes 222 and a battery 260 for powering the light emitting diodes 222. This eliminates the need for a separate power unit 60, 160. The housing section 224 includes a transparent or translucent section 225 through which light emitted by the light emitting diodes 222 can be seen. The light assembly 200 can be removed from the attachment assembly 40 and used as a hand-held flashlight when desired.

According to a preferred embodiment, the light assembly 200 can include wireless technology, such as the wireless communication technology sold under the mark "BLUETOOTH", which is operatively connected to the light emitting diodes 222 and a remote control, such that the remote control can turn the light emitting diodes 20 on and off. The remote control can be a computing device comprising a computer processor, such as a computer or mobile smartphone. The remote control can be operated by a human user that activates the light emitting diodes 222 at times the user deems appropriate. Alternatively, the remote control comprises a computer processor and a non-transitory computer readable storage medium comprising software having programming instructions that, when executed, cause the computer processor to automatically activate the light emitting diodes 222 at a predetermined time of day. In another embodiment, the software can be integrated into a mobile application that can be downloaded onto mobile smartphones and allows a user to control the light emitting diodes 222 with a mobile smartphone.

Figure 15:
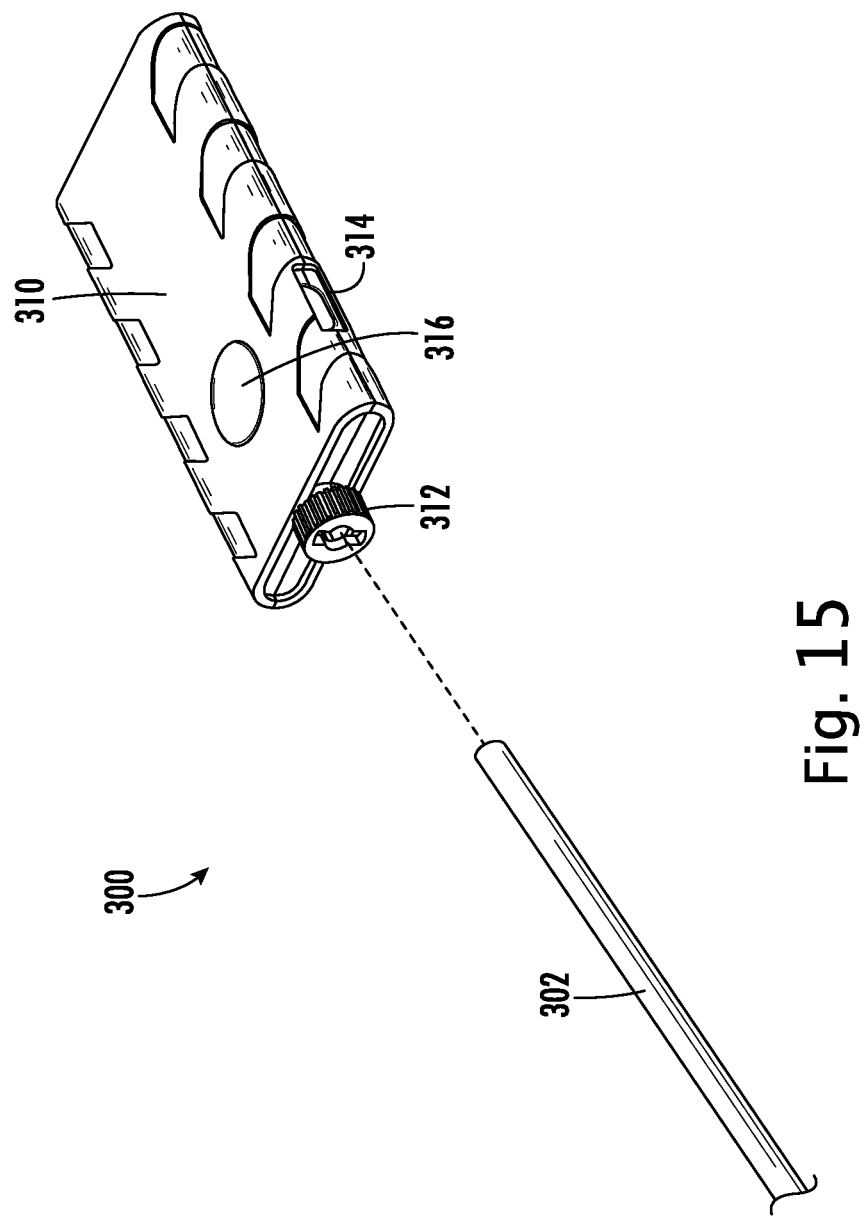
FIG. 15 is a perspective view of an illumination apparatus according to another embodiment of the invention.
Figure 16:
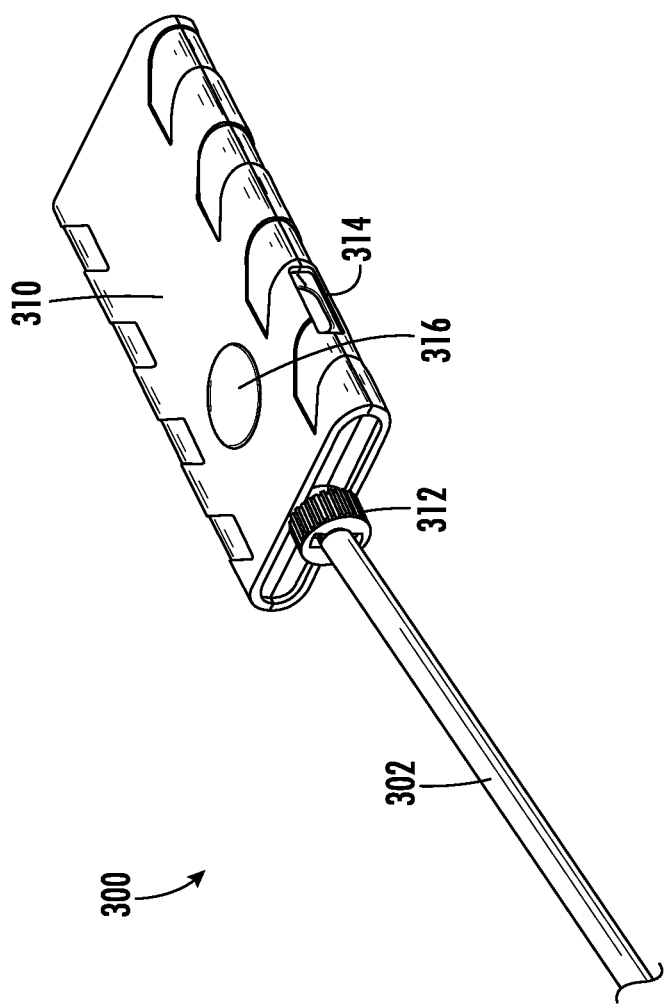
FIG. 16 is another perspective view of the apparatus of FIG. 15.

Another embodiment of the invention comprises an illumination apparatus illustrated in FIGS. 15-16 and shown generally at reference numeral 300. The apparatus is comprised of a fiber optic lighting cable 302 and a light emitting unit 310 adapted to transmit light into the cable 302. The cable 302 is transparent or translucent. Preferably, the cable 302 is comprised of thermoplastic polyurethane (TPU). Alternatively, the cable 302 can be comprised of polymethylmethacrylate (PMMA) or methyl methacrylate (MMA).

The light emitting unit 310 comprises a housing containing a light emitting device, such as at least one light emitting diode. The light unit 310 includes a power source for the light emitting diode. The power source can be a rechargeable lithium ion battery that can be recharged via a mini-USB charger. The light unit 310 includes a USB port 314 for receiving the mini-USB charger. Alternatively, the power source can be one or more non-rechargeable alkaline batteries.

The light unit 310 includes a portal 312 that is shaped and sized to receive and frictionally engage an end of the cable 302, as shown in FIG. 16. The portal 312 can include a quick connect/disconnect ferrule adapted for fiber optic light cables. The light emitting diode can be positioned adjacent to the portal 312. The light unit 310 can include an on/off button 316 operatively connected to the light emitting diode whereby pressing the button 316 (when the light emitting diode is off) turns the light emitting diode on at full intensity, pressing the button 316 a second time puts the light emitting diode into a lower intensity mode, and pressing the button 316 a third time turns the light emitting diode off. When the cable 302 is positioned in the portal 312, as shown in FIG. 16, and the light emitting diode is turned on, the light from the light emitting diode passes through the cable 302 and the cable 302 is illuminated.

The lithium ion battery can have a life of about four hours when the light emitting diode is on full intensity, and a life of six hours when the light emitting diode is on at low intensity. The light emitting diode can be white or various colors, such as green, red or blue.

According to an embodiment of the invention, the light unit 310 can be operatively connected to wireless technology, such as the wireless communication technology sold under the mark "BLUETOOTH", and the light unit 310 can be controlled remotely by a mobile electronic device such as a smartphone via IOS/Android platforms.

Figure 17:
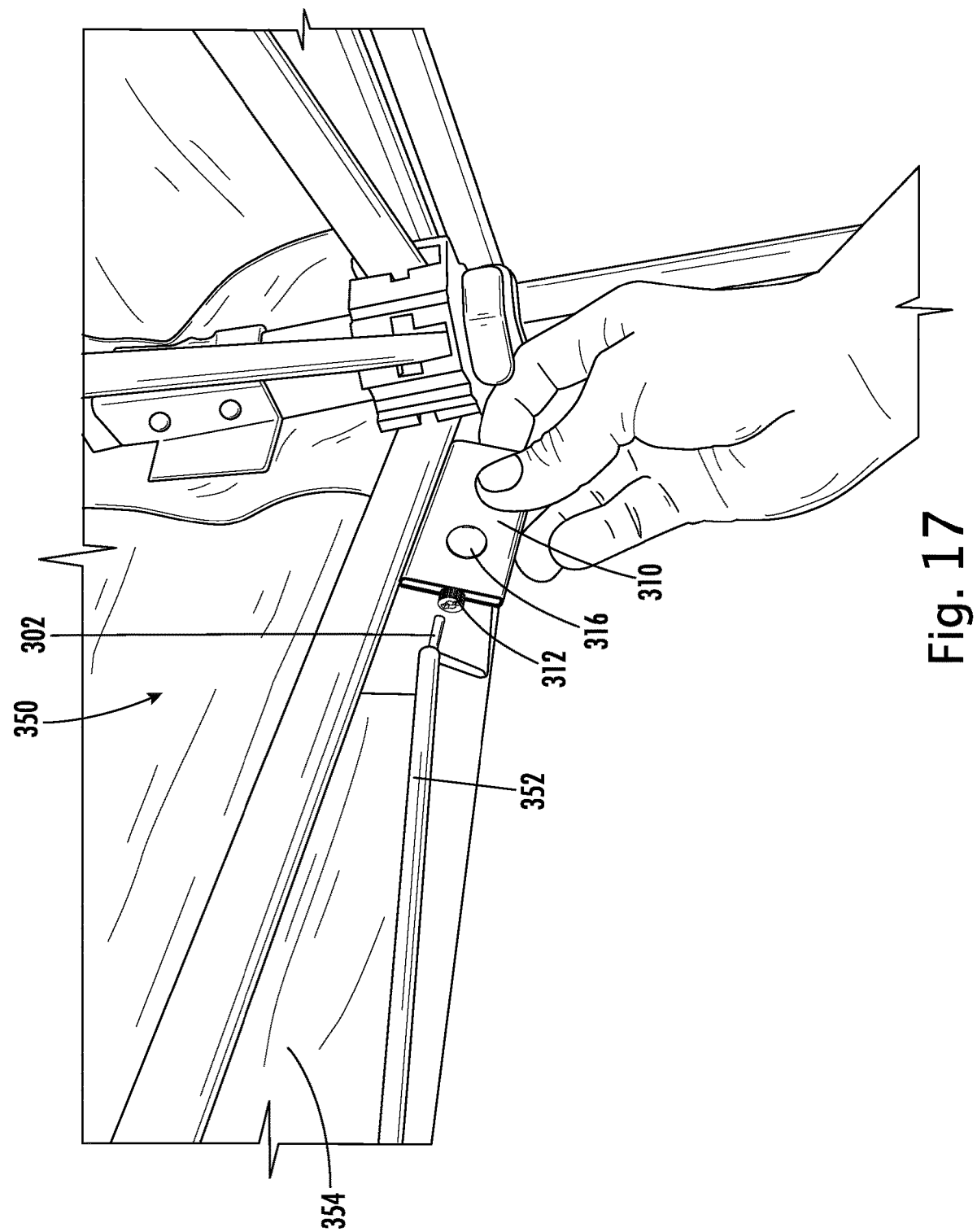
FIG. 17 is environmental perspective view of another embodiment of the invention.
Figure 18:
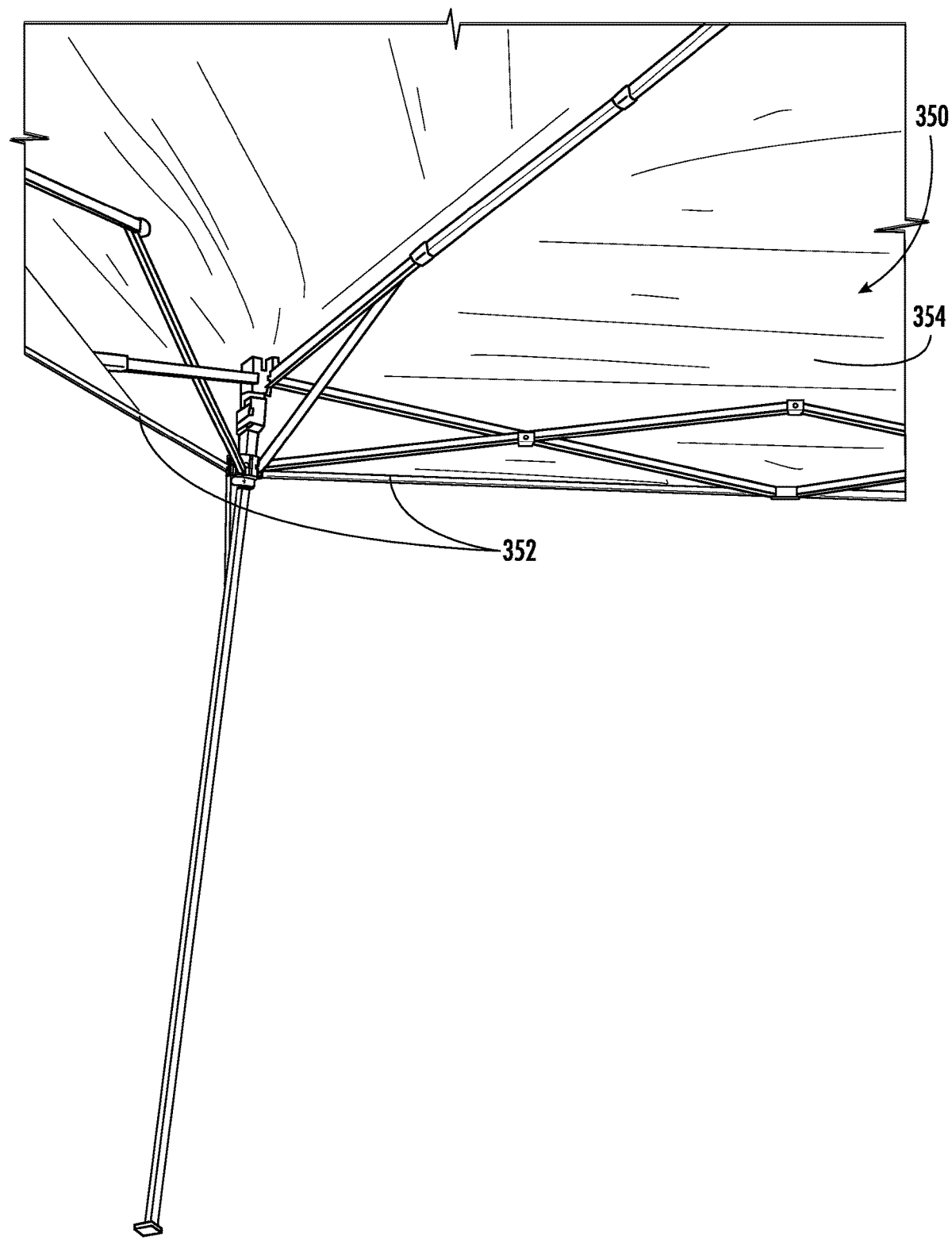
FIG. 18 is another environmental perspective view of the apparatus of FIG. 17.

Another embodiment of the invention comprises a tent, canopy or like structure comprising the illumination apparatus 300. As shown in FIGS. 17 and 18, the illumination apparatus 300 can be attached to the fabric of a tent 350 and can illuminate the area in and around the tent 350. The tent 350 can be a collapsible tent, also known as a folding or pop-up tent. A sleeve member 352 can be attached proximate the bottom edge of the fabric top 354 of the tent 350. The sleeve member 352 includes a hollow tube section for receiving the cable 302. The sleeve member 352 can be sewn to the fabric 354 of the tent 350. Alternatively, the tube 352 can be attached to the tent fabric 354 by hook and loop fasteners (VELCRO), magnets or adhesive.

Figure 20:
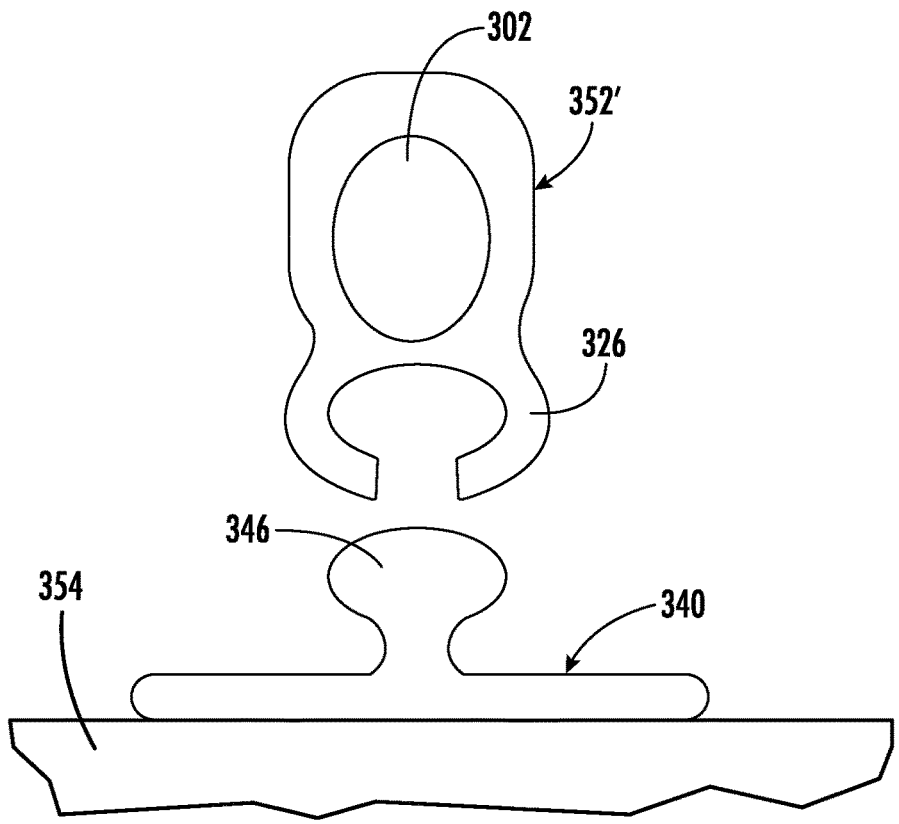
FIG. 20 is a front elevation view of another embodiment of the invention.
Figure 21:
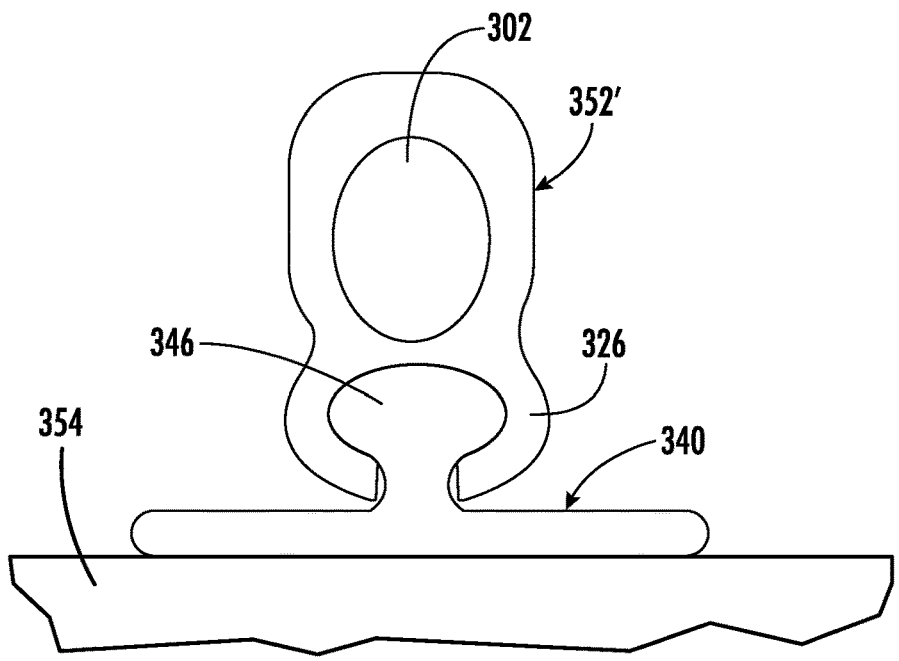
FIG. 21 is another front elevation view of the apparatus of FIG. 20.

In another alternative embodiment, the sleeve member 352' can include an attachment section 326, similar to the previously described attachment section 26, as shown in FIGS. 20 and 21. A complementary attachment assembly 340, similar to the previously described attachment assembly 40, can be attached to the tent fabric 354. The attachment section 326 receives and engages the attachment member 346 of the attachment assembly 340, whereby the tube 352' is releasably attached to the tent fabric 354. It should be noted that the sleeve member 352' and attachment assembly 340 can be used to incorporate the illumination apparatus 300 into items other than a tent. In one embodiment, the attachment assembly 340 can be attached to a garment, such as a shirt, vest or jacket, and the sleeve member 352' can be releasably attached to the attachment assembly 340.

The fiber optic lighting cable 302 is positioned within the tube 352, except for an end of the tube 352 that extends outwardly from the tube 352 for positioning in the portal 312 of the light unit 310, as shown in FIG. 17. Preferably, the tube 352 and the cable 302 positioned within the tube 352 extend completely around the perimeter of the tent fabric 354.

The light unit 310 can be releasably attached to the tent 350. In one embodiment, the light unit 310 can be attached to the tent fabric 354 by hook and loop fasteners (VELCRO). Hook fasteners can be positioned on the light unit 310, and loop fasteners can be positioned on the tent fabric 354 for complementary engagement with the hook fasteners on the light unit 310. Alternatively, loop fasteners can be positioned on the light unit 310, and hook fasteners can be positioned on the tent fabric 354. In another embodiment, the light unit can be attached to the tent fabric by a magnet. A magnet can be attached to the tent fabric 354, and the light unit 310 can comprise a material having magnetic properties whereby the light unit 310 is magnetically attracted to the magnet positioned on the tent fabric 354 thereby releasably attaching the light unit 310 to the tent fabric 354. In another embodiment, the light unit 310 can be positioned within a pocket attached to the tent fabric 354. In yet another embodiment, the light unit 310 can be held to the tent fabric 354 by straps attached to the tent fabric 354. The light unit 310 is releasably attached to the tent fabric 354 so that the light unit 310 can be easily removed for repair, recharging, disposal, and/or battery replacement. The light unit 310 is not permanently attached or electrically connected to the tent 350. As such, the light unit 310 can be easily removed from the tent 350 if desired.

Figure 19:
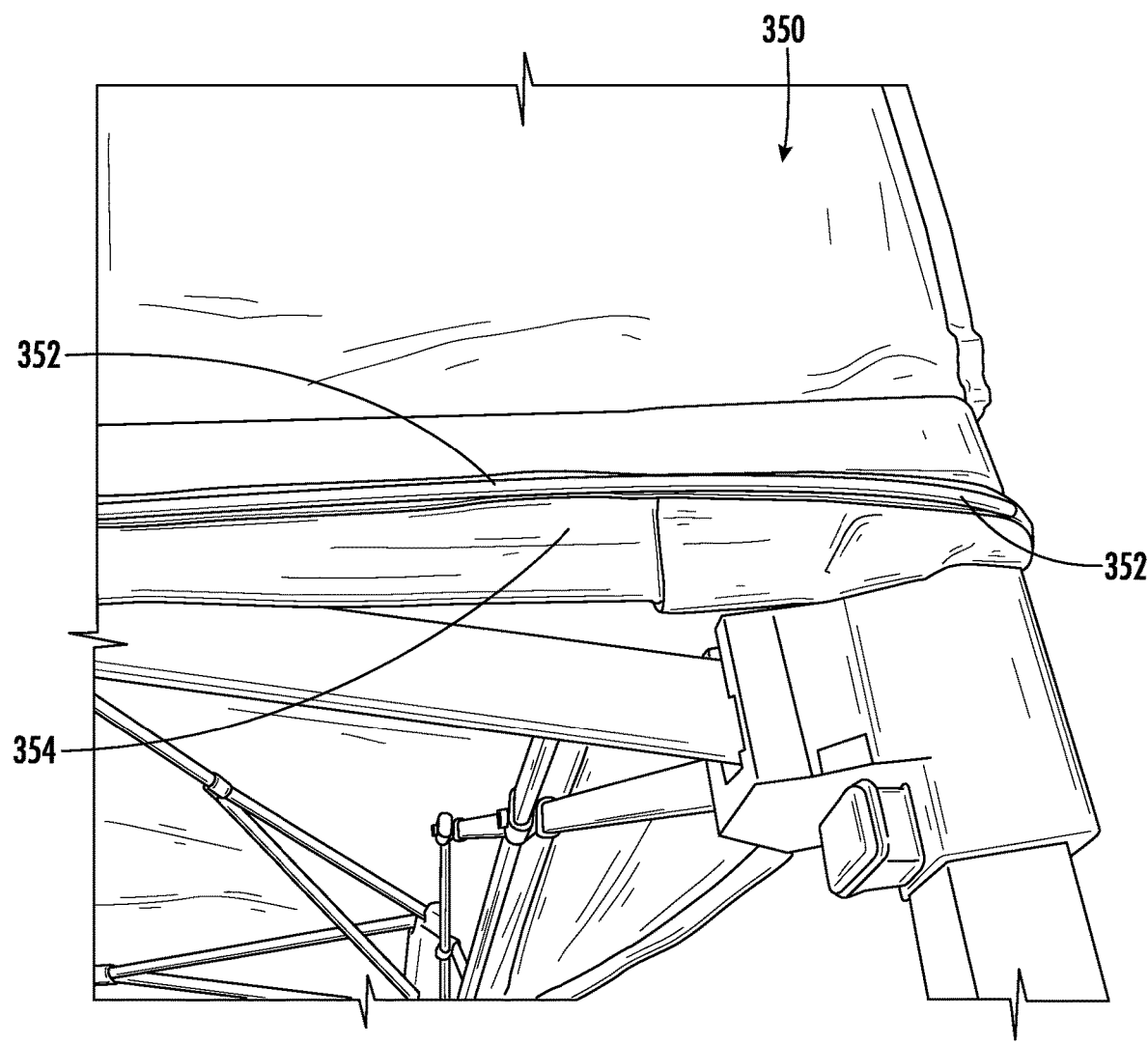
FIG. 19 is another environmental perspective view of the apparatus of FIG. 17.

The tube 352 is made of a flexible material that is transparent or translucent to allow light emanating from the cable 302 to pass through the tube 352. When the light unit 310 is activated the cable 302 illuminates the area in and around the tent 350. The tube 352 can be separated proximate each corner of the tent 350, a shown in FIG. 19, to facilitate the cable 302 extending around each corner of the tent 350. The cable 302 and the tube 352 are flexible so the tent 350 can be easily folded and re-opened without damaging the cable 302 or tube 352.

Another embodiment of the invention comprises a garment, such as a shirt, vest or jacket comprising a light emitting device, such as the illumination apparatus 300. The cable 302 can be positioned within a first recess in the garment. The light unit 310 can be positioned in a second recess in the garment. Alternatively, the light unit 310 can be attached to the garment fabric by hook and loop fasteners (VELCRO). Hook fasteners can be positioned on the light unit 310, and loop fasteners can be positioned on the garment fabric for complementary engagement with the hook fasteners on the light unit 310. Alternatively, loop fasteners can be positioned on the light unit 310, and hook fasteners can be positioned on the garment. In another embodiment, the light unit 310 can be attached to the garment by a magnet. A magnet can be attached to the garment, and the light unit 310 can comprise a material having magnetic properties whereby the light unit 310 is magnetically attracted to the magnet positioned on the garment thereby releasably attaching the light unit 310 to the garment. In another embodiment, the light unit 310 can be positioned within a pocket in the garment. In yet another embodiment, the light unit 310 can be attached to the garment by straps attached to the garment fabric. The light unit 310 is releasably attached to the garment fabric, and is not electrically connected to the garment fabric. As such, the light unit 310 can be easily removed from the garment for repair, recharging, disposal, and/or battery replacement.

According to an embodiment of the invention, the garment can also include a temperature regulating element adapted to alter the temperature of the garment and/or the wearer of the garment. The temperature regulating element can be positioned within a third recess formed in the garment. The temperature regulating element can be a reusable refrigerant gel pack, such as the water-activated flexible gel packs sold by ThermaFreeze Products Corporation under the name "THERMAFREEZE 1 ounce Cubes." Alternatively, the cooling element can be the reusable cold pack sold under the name THERA-MED. In another alternative embodiment, the cooling element can comprise a package containing a gel formulation comprised of propylene glycol and water. Other refrigerant gel compositions are described in U.S. Pat. No. 4,357,809, which is incorporated by reference herein. In another embodiment, the temperature regulating element can be a heating element, such as a flexible, rechargeable heater sheet or an electric blanket.

Another embodiment of the invention comprises a container, such as a thermally insulated cooler, in which the cable 302 is positioned in a recess formed in the container. The recess is shaped and sized to receive and frictionally engage the cable 302. The light unit 310 can be positioned within a second recess formed in container that can be shaped and sized to receive and frictionally engage the light unit 310.

Another embodiment of the invention comprises a vehicle, such as a boat, in which the cable 302 is positioned within a channel formed in the boat. The cable 302 can be connected to the light unit 310, which can be positioned within a recess formed in the boat or attached to the boat by other means, such as magnets or hook and loop fasteners.

Figure 22:
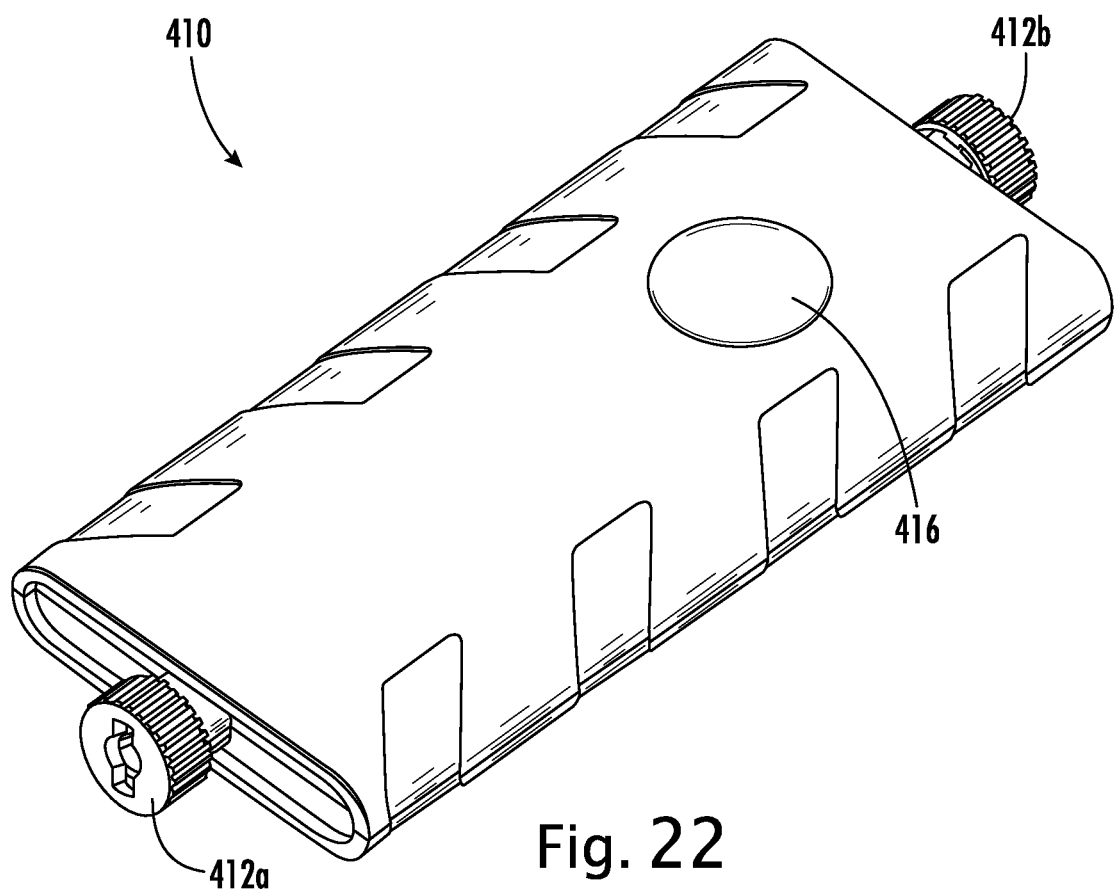
FIG. 22 is a perspective view of another embodiment of the invention.

FIG. 22 illustrates a light unit 410 according to an alternative embodiment in which the light unit 410 has first and second portals 412a, 412b at opposite ends of the unit 410 for receiving fiber optic lighting cables 402a, 402b. The light unit 410 can include a first light emitting diode positioned proximate the first portal 412a, and a second light emitting diode positioned proximate the second portal 412b. The light unit 410 includes an on/off button 416.

Figure 23:
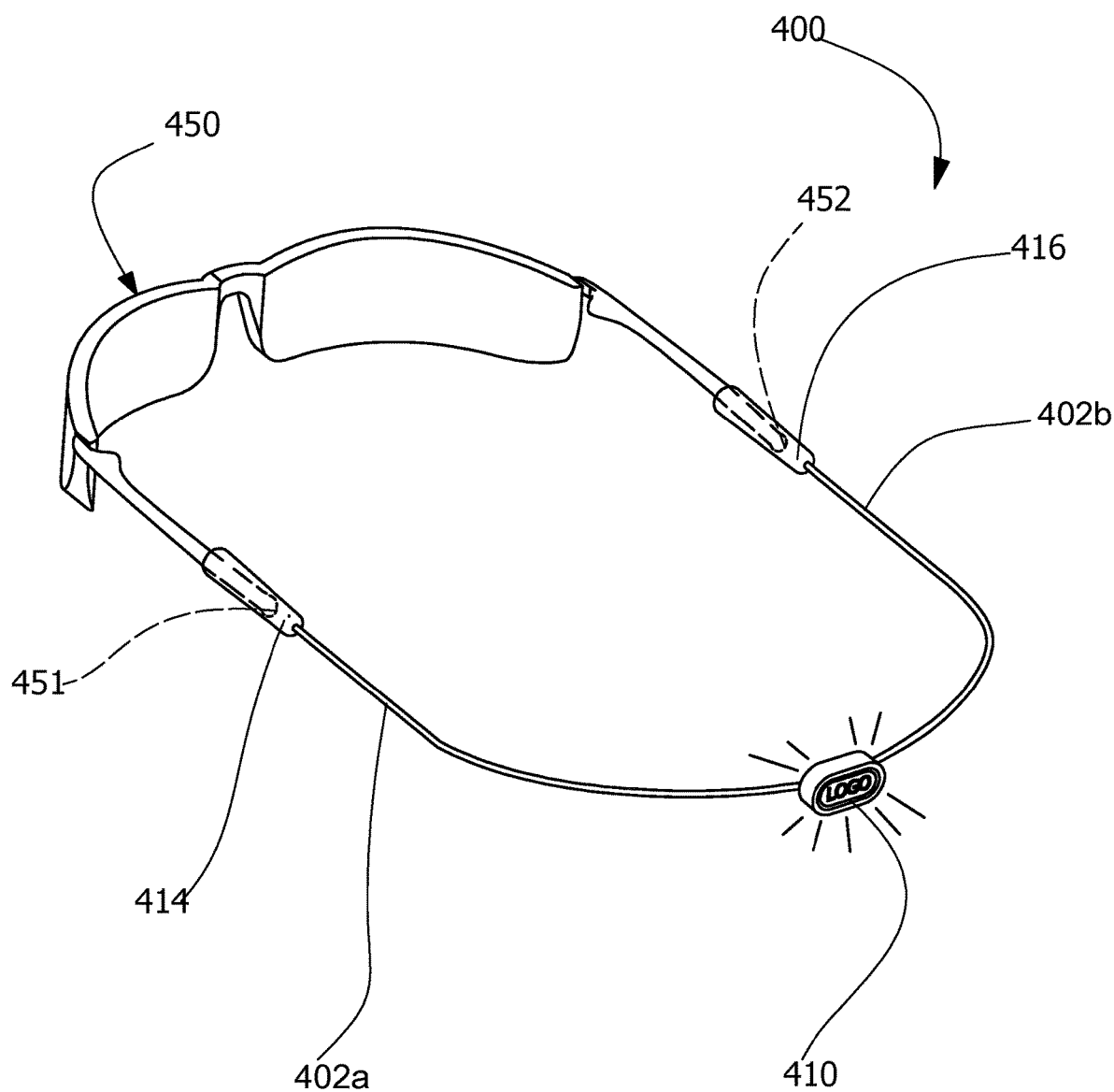
FIG. 23 is a perspective view of an eyewear retainer apparatus according to an embodiment of the invention.

An embodiment of the invention comprises an eyewear retainer apparatus, as shown generally at reference numeral 400 in FIG. 23. The apparatus 10 comprises the light unit 410 and fiber optic lighting cables 402a, 402b.

A pair of attachment members 414, 416 can be positioned at ends of each cable 402a, 402b. The attachment members 414, 416 are adapted for releasable attachment to the temples 451, 452 of a pair of eyeglasses 450, as shown in FIG. 23. The attachment members 414, 416, can be tubular members made of rubber or other flexible and resilient material that are sized to fit over the ends of the temples 451, 452 or over earpieces that are positioned over the ends of the temples 451, 452.

Figure 24:
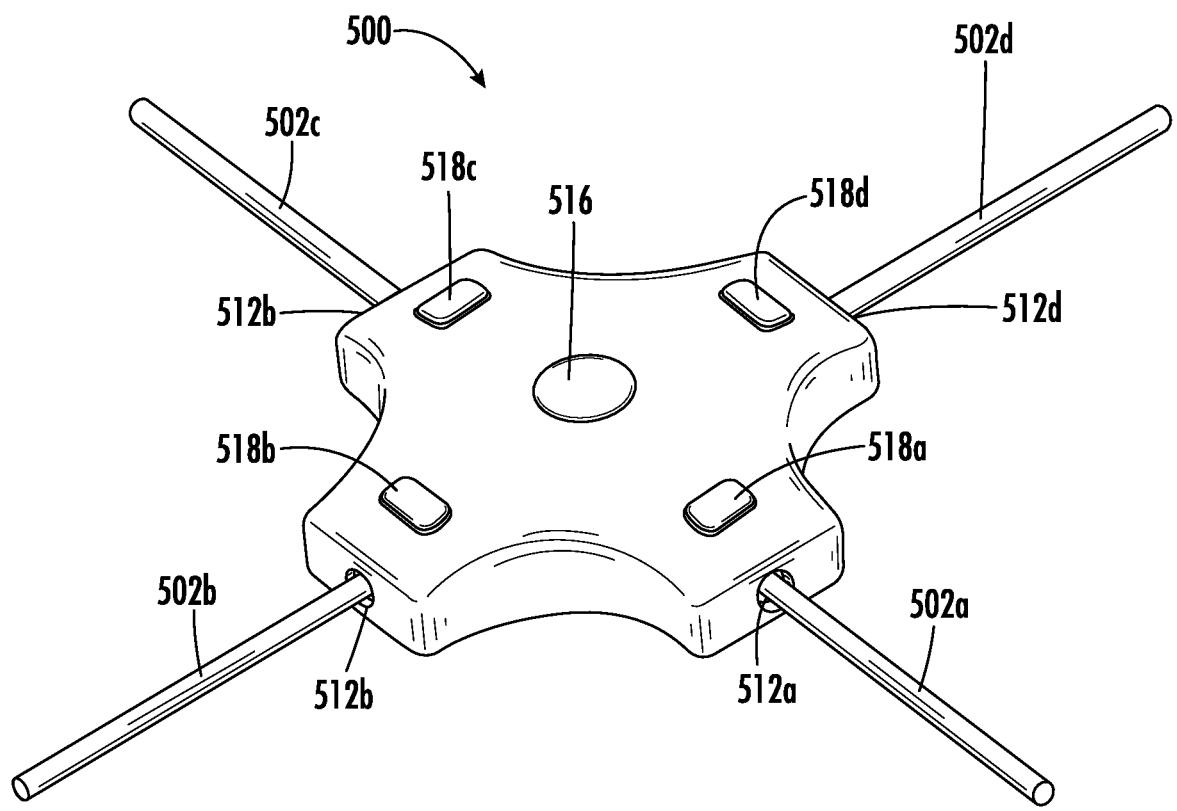
FIG. 24 is a perspective view of an illumination apparatus according to another embodiment of the invention.

FIG. 24 illustrates an illumination apparatus 500 according to another embodiment of the invention. The apparatus 500 comprises a light unit 510 having four portals 512a, 512b, 512c, 512d for receiving fiber optic cables 502a, 502b, 502c, 502d, respectively. The light unit 510 can include four light emitting diodes positioned proximate the four portals 512a, 512b, 512c, 512d. The unit 510 includes a power on/off button 516, and buttons 518a, 518b, 518c, 518d for activating each of the four light emitting diodes.

According to an embodiment of the invention, the cables 502a, 502b, 502c, 502d can be positioned in sleeve members that are sewn into the seams of the fabric top of the tent in a cross-like orientation. An end of each cable 502a, 502b, 502c, 502d is positioned in the portals 512a, 512b, 512c, 512d of the light unit 510, which can be positioned at the center of the fabric top. The four cables 502a, 502b, 502c, 502d positioned in a cross-like orientation across the fabric top provide vibrant illumination of the interior area of the tent. The light unit 510 is supported at the top center of the tent by the cables 502a, 502b, 502c, 502d. Complementary fasteners, such as hook and loop fasteners or magnets, can be positioned on the light unit 510 and the tent fabric to provide additional support to keep the light unit 510 in place.

Figure 25:
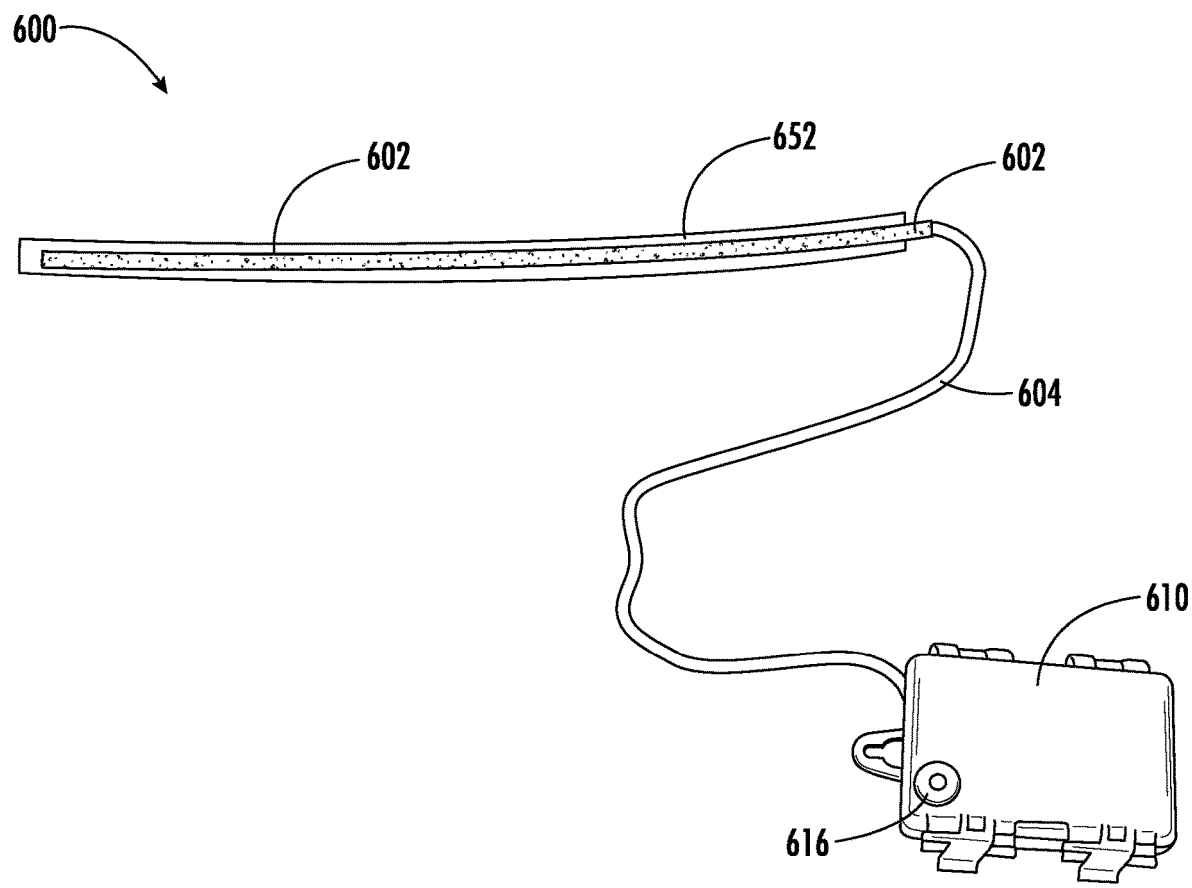
FIG. 25 is a perspective view of an illumination apparatus according to another embodiment of the invention.
Figure 26:
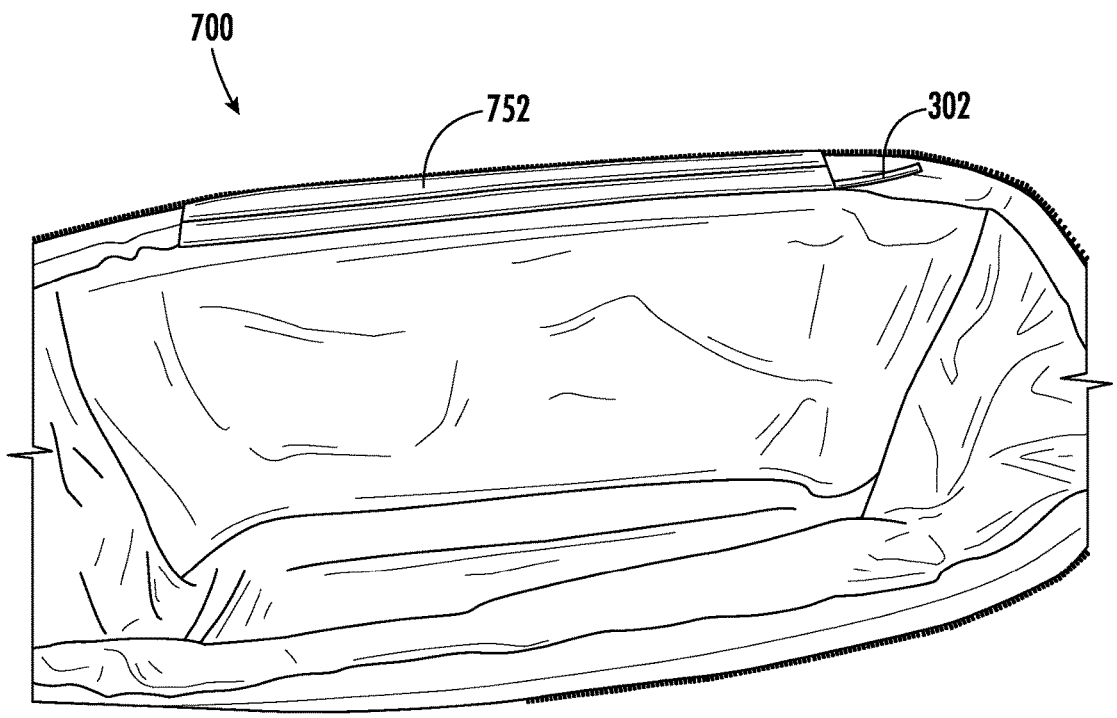
FIG. 26 is a perspective view of a container apparatus according to another embodiment of the invention.
Figure 27:
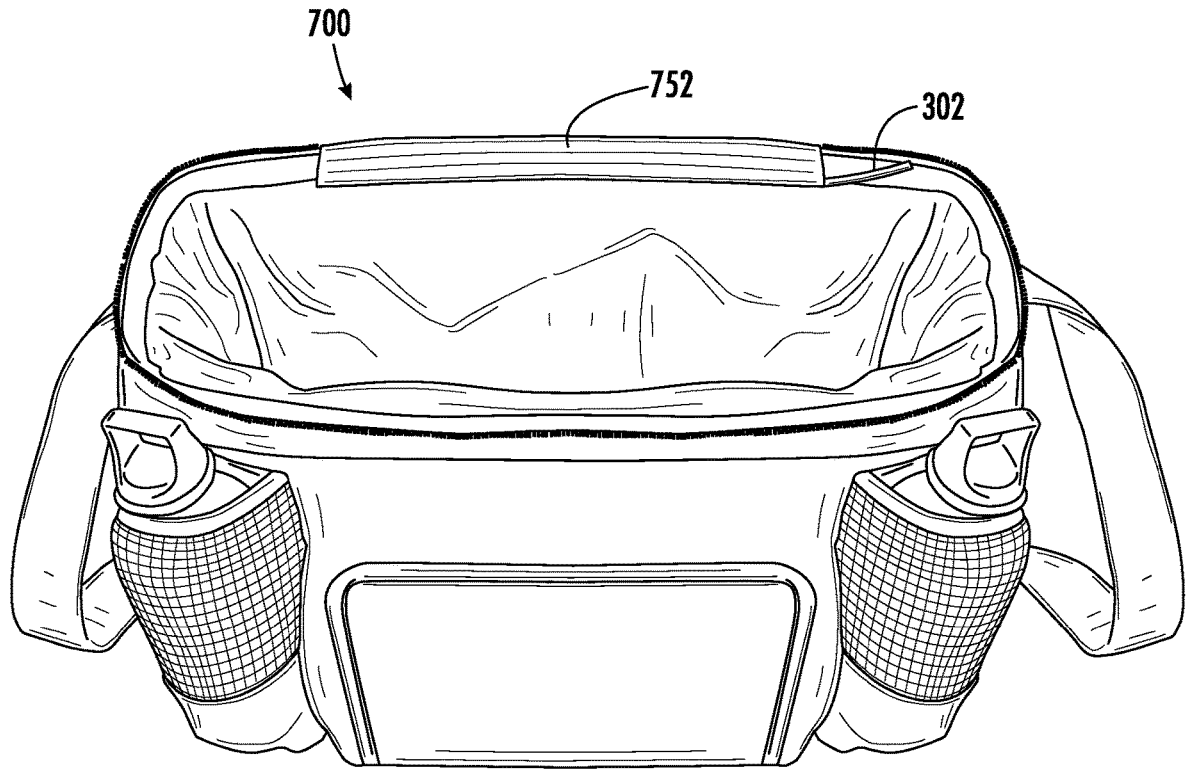
FIG. 27 is another perspective view of the apparatus of FIG. 26.
Figure 28:
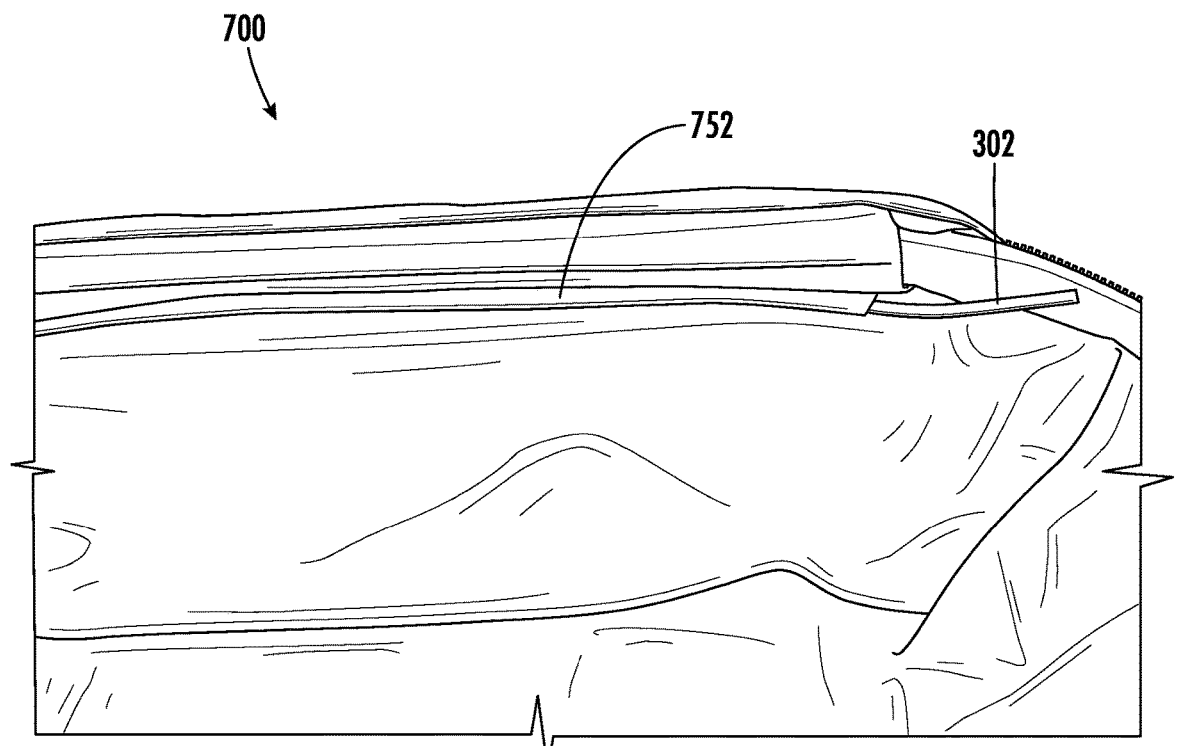
FIG. 28 is another perspective view of the apparatus of FIG. 26.
Figure 29:
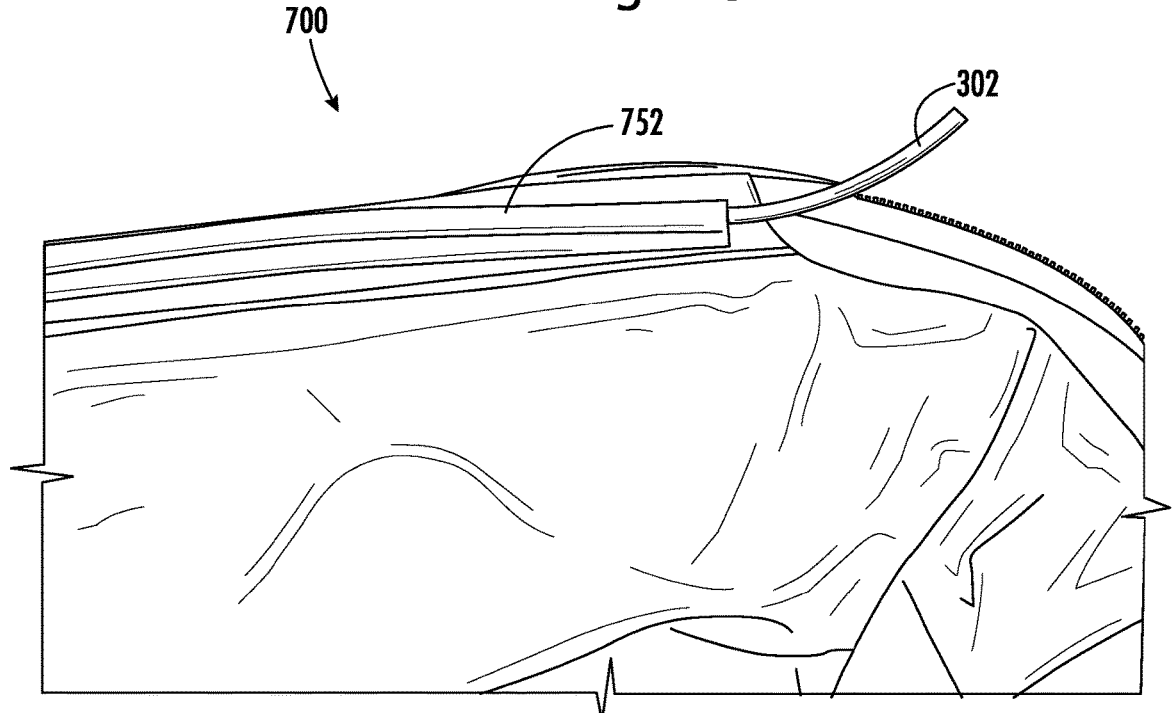
FIG. 29 is another perspective view of the apparatus of FIG. 26.

An illumination apparatus according to another embodiment of the invention is illustrated in FIG. 25, and shown generally at reference numeral 600. The apparatus 600 comprises an LED strip 602 operatively connected by electrical wire 604 to a power unit 610. The power unit 610 can comprise a housing containing a plurality of AA alkaline batteries and an on/off button 616 for turning the LED strip 602 on and off. The LED strip 602 is positioned within a flexible sleeve member 652. The sleeve 652 is made of a flexible material that is transparent or translucent to allow light emanating from the LED strip 602 to pass through the sleeve 652.

According to an embodiment of the invention, the sleeve 652 containing the LED strip can be sewn proximate the bottom edge of the fabric top of a tent. Alternatively, the sleeve 652 can be attached to the tent fabric by hook and loop fasteners (VELCRO), magnets or adhesive.

The power unit 610 can be releasably attached to the tent. In one embodiment, the power unit 610 can be attached to the tent fabric by hook and loop fasteners (VELCRO). Hook fasteners can be positioned on the power unit 610, and loop fasteners can be positioned on the tent fabric for complementary engagement with the hook fasteners on the power unit 610. Alternatively, loop fasteners can be positioned on the power unit 610, and hook fasteners can be positioned on the tent fabric. In another embodiment, the light unit can be attached to the tent fabric by a magnet. A magnet can be attached to the tent fabric, and the power unit can comprise a material having magnetic properties whereby the power unit 610 is magnetically attracted to the magnet positioned on the tent fabric thereby releasably attaching the power unit 610 to the tent fabric. In another embodiment, the power unit 610 can be positioned within a pocket attached to the tent fabric. In yet another embodiment, the power unit 610 can be held to the tent fabric by straps attached to the tent fabric. The power unit 610 is releasably attached to the tent fabric so that the power unit 610 can be easily removed for repair, recharging, disposal, and/or battery replacement.

Another embodiment of the invention comprises a container apparatus, such as the thermally insulated cooler illustrated in FIGS. 26-29, and shown generally at reference numeral 700. The container 700 includes a sleeve member 752 attached to the interior of the container 700. The sleeve member 752 comprises a tubular section for receiving the cable 302 therein, and a substantially flat section for attaching to the container 700. The flat section of the sleeve member 752 can be sewn to the interior of the container 700. The exposed end of the cable 302 extending outwardly from the sleeve member 752 can be connected to the light unit 310. The light unit 310 can be positioned in a pocket formed in the interior of the container 700. The container 700 can include a flap 762 for covering the sleeve member 752.

Figure 30:
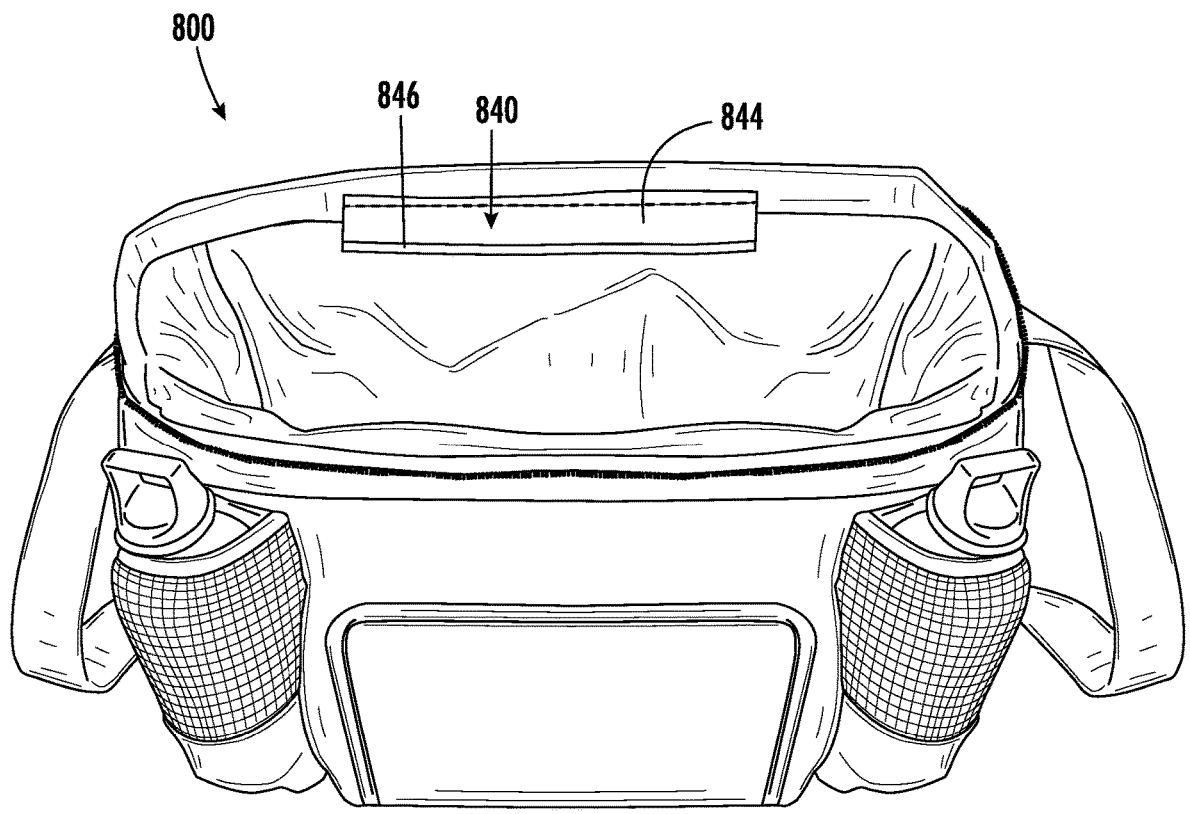
FIG. 30 is a perspective view of a container apparatus according to another embodiment of the invention.
Figure 31:
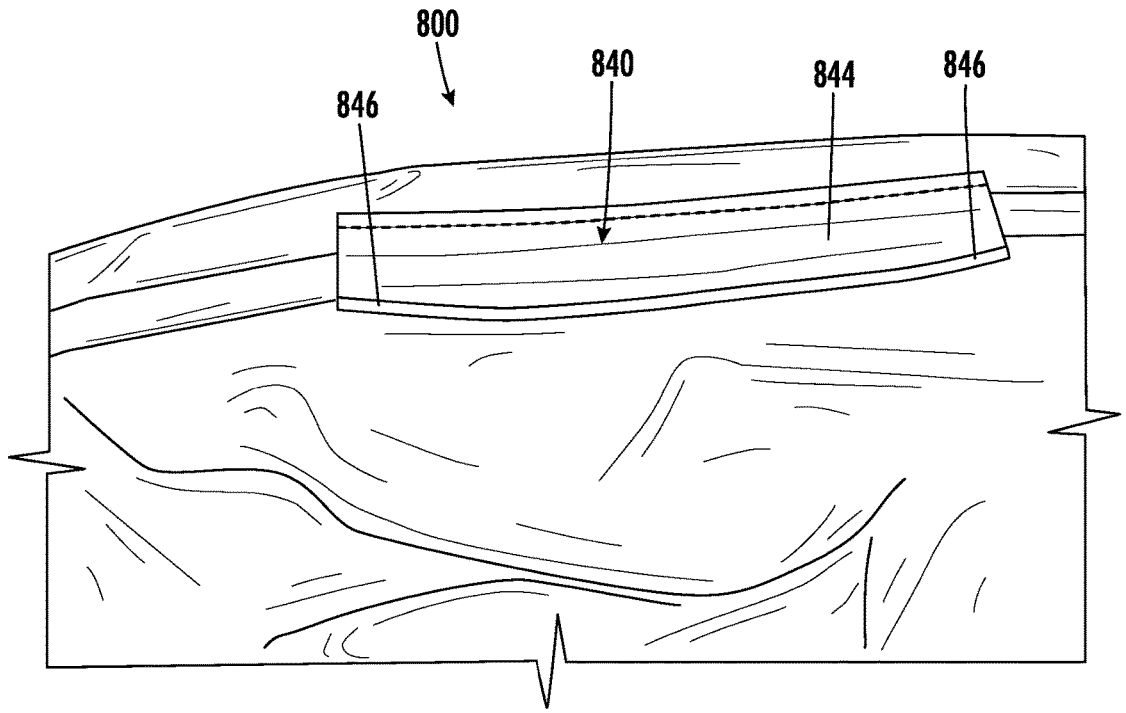
FIG. 31 is another perspective view of the apparatus of FIG. 30.

A container apparatus according to another embodiment of the invention is illustrated in FIGS. 30 and 31, and shown generally at reference numeral 800. The container apparatus 800 can be a thermally insulated cooler. The container 800 includes an attachment assembly 840 adapted for complementary engagement with previously described light assembly 200. The attachment assembly 840 comprises a substantially flat section 844 that can be sewn to the container 800, and a spherical attachment member 846 formed at the edge of the flat section 844. The light assembly 200 can be releasably attached to the attachment assembly 840 by sliding the attachment member 846 of the attachment assembly 840 into the attachment section 226 of the light assembly 200. The light assembly 200 can be removed from the attachment assembly 40 and used as a hand-held flashlight when desired.

According to an embodiment of the invention, the illumination apparatus 300 can be incorporated into a portable bathroom, known as a "Porta Jon" or "Porta Potty". The cable 302 can be positioned within a recess or crevice in a wall of the Porta Jon. Alternatively, the cable 302 can be attached to the Porta Jon by an adhesive, magnets or hook and loop fastener (Velcro). The light unit 310 can be attached to the Porta Jon by magnets or hook and loop fastener (Velcro). The light unit 310 can include a photo sensor operatively connected to the light emitting diode so that the light emitting diode is activated when no little or no light is detected by the sensor.

An illumination apparatus and method of using same are described above. Various changes can be made to the invention without departing from its scope. The above description of embodiments of the invention are provided for the purpose of illustration only and not limitation—the invention being defined by the claims and equivalents thereof.

What is claimed is:

1. A tent apparatus comprising:
   (a) a support frame;
   (b) a flexible sheet carried on the support frame;
   (c) an attachment assembly attached to the flexible sheet, wherein the attachment assembly comprises a substantially flat base section and an attachment member extending outwardly from the base section; and
   (d) a light assembly releasably attached to the attachment assembly and comprising a housing section containing at least one light emitting device therein, wherein the light assembly comprises an attachment section adapted for releasable attachment to the attachment assembly, the attachment section defining a recess having a size and shape that is complementary to the attachment member of the attachment assembly, whereby the light assembly and the attachment assembly are releasably attached to each other by complementary frictional engagement of the attachment member of the attachment assembly and the attachment section of the light assembly when the attachment member is positioned within the attachment section.

2. The tent apparatus according to claim 1, wherein the attachment assembly comprises a substantially flat base section and an attachment member extending outwardly from the base section.

3. The tent apparatus according to claim 2, wherein the base section of the attachment assembly is sewn to the flexible sheet.

4. The tent apparatus according to claim 3, wherein the flexible sheet comprises fabric.

5. The tent apparatus according to claim 4, wherein the base section of the attachment assembly is sewn at a seam of the fabric.

6. The tent apparatus according to claim 1, wherein the light assembly can slide on the attachment assembly when the attachment member is positioned in the attachment section.

7. The tent apparatus according to claim 1, wherein the light assembly comprises a light emitting diode operatively connected to at least one fiber optic cable, and wherein the housing section defines a portal shaped and sized to receive and frictionally engage a first end of the at least one fiber optic cable, the light emitting diode emitting light into the at least one fiber optic cable whereby the cable is illuminated.

8. The tent apparatus according to claim 7, wherein the light assembly further comprises a power source operatively connected to the light emitting diode to power the light emitting diode.

9. The tent apparatus according to claim 7, wherein the at least one fiber optic cable is comprised of at least one material selected from a group consisting of thermoplastic polyurethane, polymethylmethacrylate, and methyl methacrylate.

10. The tent apparatus according to claim 7, wherein the portal comprises a quick connect/disconnect ferrule adapted for engagement with the at least one fiber optic cable.

11. The tent apparatus according to claim 7, further comprising a sleeve member comprised of a transparent or translucent material and attached to the flexible sheet, the at least one fiber optic cable partially positioned within the sleeve member.

12. The tent apparatus according to claim 7, wherein the attachment assembly comprises hook and loop fasteners.

13. The tent apparatus according to claim 1, wherein the attachment assembly and the light assembly are elongate and equal in length.

14. A tent apparatus comprising:
   (a) a support frame;
   (b) a flexible sheet carried on the support frame;
   (c) an attachment assembly attached to the flexible sheet, wherein the attachment assembly comprises a substantially flat base section and a substantially oval shaped attachment member extending outwardly from the base section; and
   (d) a light assembly releasably attached to the attachment assembly and comprising a housing section containing at least one light emitting device therein, the light assembly comprising an attachment section defining a substantially oval shaped recess sized and shaped to receive the attachment member of the attachment assembly, whereby the light assembly and the attachment assembly are releasably attached to each other by complementary frictional engagement of the attachment member of the attachment assembly and the attachment section of the light assembly when the attachment member is positioned within the attachment section.

15. The tent apparatus according to claim 14, wherein the attachment section of the light assembly comprises a substantially C-shaped member defining said recess.

16. A garment apparatus comprising a garment and a light assembly releasably attached to the garment, the light assembly comprising:

(a) at least one fiber optic cable;
(b) a housing containing a light emitting diode operatively connected to the at least one fiber optic cable, the housing defining a portal shaped and sized to receive and frictionally engage a first end of the at least one fiber optic cable, the light emitting diode emitting light into the at least one fiber optic cable whereby the cable is illuminated; and
(c) wherein a first recess is formed in the garment to receive and retain the at least one fiber optic cable therein.

17. The garment apparatus according to claim 16, wherein the at least one fiber optic cable is comprised of at least one material selected from a group consisting of thermoplastic polyurethane, polymethylmethacrylate, and methyl methacrylate.

18. The garment apparatus according to claim 16, wherein a second recess is formed in the garment to receive and retain the housing therein.

19. A garment apparatus comprising:
(a) a garment;
(b) an attachment assembly comprising a substantially flat base section and an attachment member extending outwardly from the base section, the base section of the attachment assembly attached to an outer surface of the garment; and
(c) a light assembly releasably attached to the attachment assembly and comprising a housing section containing at least one light emitting device therein, wherein the light assembly comprises an attachment section adapted for releasable attachment to the attachment assembly, the attachment section defining a recess having a size and shape that is complementary to the attachment member of the attachment assembly, whereby the light assembly and the attachment assembly are releasably attached to each other by complementary frictional engagement of the attachment member of the attachment assembly and the attachment section of the light assembly when the attachment member is positioned within the attachment section.

20. The garment apparatus according to claim 19, wherein the garment is selected from the group consisting of a shirt, vest, and jacket, and further wherein the base section of the attachment assembly is sewn to the garment.

* * * * *